US012651352B2

(12) United States Patent
Kim et al.

(10) Patent No.: US 12,651,352 B2
(45) Date of Patent: Jun. 9, 2026

(54) METHOD AND APPARATUS FOR CLASSIFYING AND EVALUATING MOTION BASED ON MOTION FEATURE

(71) Applicant: ELECTRONICS AND TELECOMMUNICATIONS RESEARCH INSTITUTE, Daejeon (KR)

(72) Inventors: Hwi-Gang Kim, Daejeon (KR); Sangbeom Lee, Daejeon (KR); Kyu Hyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 610 days.

(21) Appl. No.: 18/296,267

(22) Filed: Apr. 5, 2023

(65) Prior Publication Data
US 2024/0127459 A1 Apr. 18, 2024

(30) Foreign Application Priority Data
Oct. 18, 2022 (KR) ........................ 10-2022-0133856

(51) Int. Cl.
*G06T 7/246* (2017.01)
*G06V 10/25* (2022.01)
(Continued)

(52) U.S. Cl.
CPC .............. *G06T 7/246* (2017.01); *G06V 10/25* (2022.01); *G06V 10/44* (2022.01); *G06V 10/761* (2022.01);
(Continued)

(58) Field of Classification Search
CPC ........ G06V 40/23; G06V 10/62; G06V 10/72; G06V 10/771; G06V 10/7715;
(Continued)

(56) References Cited

U.S. PATENT DOCUMENTS

2006/0018516 A1* 1/2006 Masoud ................. G06T 7/254
382/115
2007/0242873 A1* 10/2007 Gupta .................... G06V 40/28
382/159
(Continued)

FOREIGN PATENT DOCUMENTS

KR 101416282 B1 8/2014
KR 101638004 B1 7/2016
(Continued)

OTHER PUBLICATIONS

Maybel Chan Thar et al., "A Proposal of Yoga Pose Assessment Method Using Pose Detection for Self-Learning", 2019 International Conference on Advanced Information Technologies, Nov. 2019, pp. 137-142.
(Continued)

*Primary Examiner* — Alex Kok S Liew
(74) *Attorney, Agent, or Firm* — Rabin & Berdo, P.C.

(57) ABSTRACT

The present disclosure relates to a method and apparatus for classifying and evaluating a motion based on a motion feature. The method of classifying and evaluating a motion based on a motion feature includes obtaining video data by capturing a first motion, obtaining information on locations of joints of the first motion based on the video data, generating motion feature data of the first motion based on the information on the locations of the joints, and selecting a model motion most similar to the first motion, among a plurality of model motions, based on the motion feature data of the first motion and motion feature data of the plurality of model motions.

12 Claims, 47 Drawing Sheets

(51) Int. Cl.
    *G06V 10/44*       (2022.01)
    *G06V 10/74*       (2022.01)
    *G06V 10/764*     (2022.01)

(52) U.S. Cl.
    CPC .. *G06V 10/764* (2022.01); *G06T 2207/20044*
                                                (2013.01)

(58) Field of Classification Search
    CPC ........ G06V 10/82; G06V 10/98; G06V 20/42;
                G06V 20/46; A45D 2044/007; G06F
                16/285; G06F 21/316; G06F 21/6245;
                G06F 1/1626; G06F 1/1694; G06F
                18/2135; G06F 2218/12; G06F 3/011;
                G06F 3/017; G06F 30/10; G06F 30/17;
                G06F 30/27; G06N 3/02; G06N 3/043;
                           G06N 5/02; G06N 7/02
    See application file for complete search history.

(56)             References Cited

U.S. PATENT DOCUMENTS

| | | | |
|---|---|---|---|
| 2014/0145936 A1* | 5/2014 | Gu | ........................... G06F 3/005 |
| | | | 345/156 |
| 2022/0138997 A1 | 5/2022 | Kim et al. | |
| 2022/0157022 A1 | 5/2022 | Baek et al. | |
| 2023/0206472 A1* | 6/2023 | Tee | ...................... G06V 40/103 |
| | | | 382/107 |

FOREIGN PATENT DOCUMENTS

| | | |
|---|---|---|
| KR | 101814293 B1 | 1/2018 |
| KR | 10-2412553 B1 | 6/2022 |

OTHER PUBLICATIONS

Seung-yong Oh et al., "Development of posture measuring system using motion recognition sensor", The Korea Contents Association, Proceedings of the 2017 Spring Conference, May 12, 2017, pp. 391-392.

Kiaoqun Yu et al., "A Dynamic Time Warping Based Algorithm to Evaluate Kinect-Enabled Home-Based Physical Rehabilitation Exercises for Older People", sensors, 2019, 19, 2882, Jun. 28, 2019, pp. 1-17.

Rodrigo Ibanez at el., "Approximate string matching: A lightweight approach to recognize gestures with Kinect", Pattern Recognition, 62 (2017) 73-86, http://dx.doi.org/10.1016/j.patcog.2016.08.022 (Aug. 23, 2016).

Xu Yang at el., "Follower, A Novel Self-Deployable Action Recognition Framework", Sensors 2021, 21, 950, https://doi.org/10.3390/s21030950 (Feb. 1, 2021).

* cited by examiner

FIG. 1

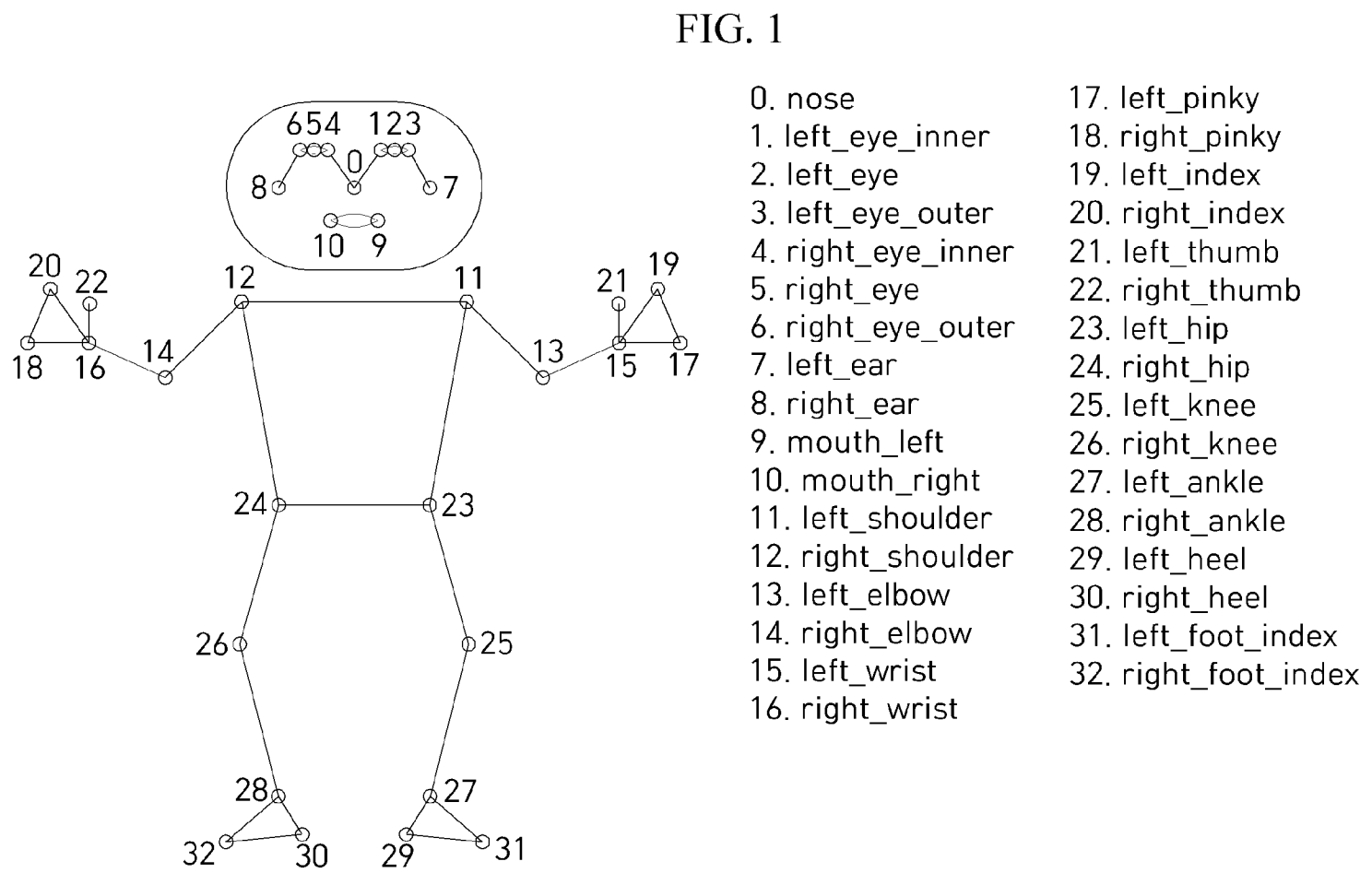

0. nose
1. left_eye_inner
2. left_eye
3. left_eye_outer
4. right_eye_inner
5. right_eye
6. right_eye_outer
7. left_ear
8. right_ear
9. mouth_left
10. mouth_right
11. left_shoulder
12. right_shoulder
13. left_elbow
14. right_elbow
15. left_wrist
16. right_wrist 17. left_pinky
18. right_pinky
19. left_index
20. right_index
21. left_thumb
22. right_thumb
23. left_hip
24. right_hip
25. left_knee
26. right_knee
27. left_ankle
28. right_ankle
29. left_heel
30. right_heel
31. left_foot_index
32. right_foot_index

FIG. 2

RIGHT ear-elbow distance

RIGHT elbow angle

LEFT wirst-hip distance

RIGHT armpit angle

LEFT ear-elbow distance

LEFT elbow angle

LEFT ear-elbow distance

FIG. 11

```
        ( START )
            │
            ▼
┌──────────────────────────┐  S210
│      OBTAIN IMAGE        │
└──────────────────────────┘
            │
            ▼
┌──────────────────────────┐  S220
│ EXTRACT SKELETON INFORMATION │
└──────────────────────────┘
            │
            ▼
┌──────────────────────────┐  S230
│   EXTRACT MOTION FEATURE  │
└──────────────────────────┘
            │
            ▼
┌──────────────────────────┐  S240
│      CLASSIFY MOTION      │
└──────────────────────────┘
            │
            ▼
        ( END )
```

FIG. 12

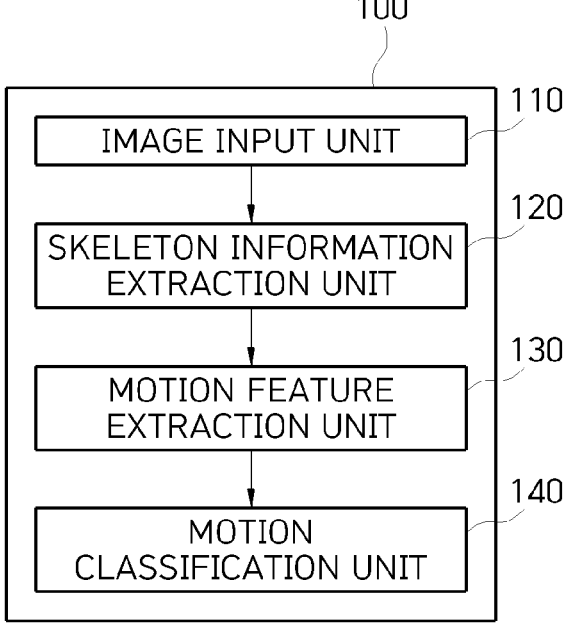

METHOD AND APPARATUS FOR CLASSIFYING AND EVALUATING MOTION BASED ON MOTION FEATURE

CROSS-REFERENCE TO RELATED APPLICATION

This application claims priority to and the benefit of Korean Patent Application No. 10-2022-0133856, filed on Oct. 18, 2022, the disclosure of which is incorporated herein by reference in its entirety.

BACKGROUND

1. Technical Field

The present disclosure relates to a method of classifying and evaluating a motion based on a motion feature for an application which recognizes a motion based on information collected by image equipment or uses the results of the recognition of the motion and an apparatus for performing the method of classifying and evaluating a motion.

2. Related Art

Recently, as an interest in health care is increased and the IT technology is developed, various types of u-health (or ubiquitous health care) equipment in which the IT technology has been grafted onto medical services are actively developed. In relation to the various types of u-health equipment, various applications based on user pose estimation using a camera are developed. To this end, there is a need for a method of analyzing, classifying, or evaluating a motion of a user.

In relation to the vision-based pose estimation technology, many researches for extracting a key point of a person that is included in an image by using artificial intelligence, such as OpenPose, or many researches for extracting a three-dimensional (3-D) skeleton using a depth camera, such as Kinect, are recently introduced. In line with these researches, various motion recognition technologies and application technologies using a skeleton extracted from a user are developed.

In the vision-based motion recognition technologies and the application technologies thereof, health care equipment using the technologies is actively developed because it is not necessary to separately attach a sensor to the body of a user and a motion of a user can be recognized even without forcing the user to behave, such as touching equipment or other sensors in actual implementations of the technologies.

However, there is a problem in that in order for various applications for user pose estimation and for indoor sports, home training, posture corrections, and re-activation therapy using the user pose estimation to be put to practical use, the efficiency and accuracy of motion analysis, classification, and evaluation based on skeleton information of a user need to be secured.

SUMMARY

Various embodiments are directed to providing a method of classifying and evaluating a motion of a user by extracting feature information of the motion from skeleton information of the user and analyzing similarity between the motion of the user and a model motion based on the feature information of the motion in a motion feature change pattern according to time series, and an apparatus for performing the method.

Objects of the present disclosure are not limited to the aforementioned object, and other objects not described above may be evidently understood by those skilled in the art from the following description.

In an embodiment, a method of classifying and evaluating a motion based on a motion feature includes obtaining video data by capturing a first motion, obtaining information on locations of joints of the first motion based on the video data, generating motion feature data of the first motion based on the information on the locations of the joints, and selecting a model motion most similar to the first motion, among a plurality of model motions, based on the motion feature data of the first motion and motion feature data of the plurality of model motions.

In an embodiment, the motion feature data of the first motion and the plurality of model motions may include at least any one of a distance between the locations of the joints and the length of an edge of a bounding box that surrounds a motion subject or a combination of the distance between the locations of the joints and the length of the edge of the bounding box.

In an embodiment, the selecting of the model motion most similar to the first motion may include calculating similarity for each motion feature with respect to each of the plurality of model motions on the basis of the first motion based on the motion feature data of the first motion and the motion feature data of the plurality of model motions, and selecting the model motion most similar to the first motion from the plurality of model motions based on the similarity for each motion feature.

In an embodiment, the selecting of the model motion most similar to the first motion may include calculating a dynamic time warping (DTW) value of each of the plurality of model motions for each motion feature on the basis of the first motion based on the motion feature data of the first motion and the motion feature data of the plurality of model motions, and selecting the model motion most similar to the first motion from the plurality of model motions based on the DTW value for each motion feature.

In an embodiment, the selecting of the model motion most similar to the first motion may include, after calculating the DTW value for each motion feature, calculating an average of the DTW values of each of the plurality of model motions for each motion feature on the basis of the first motion, and selecting a model motion having a minimum value, among the averages, as the model motion most similar to the first motion.

In an embodiment, the selecting of the model motion most similar to the first motion may include, after calculating the DTW value for each motion feature, calculating an average of the DTW values of each of the plurality of model motions for each motion feature on the basis of the first motion, and selecting, as the model motion most similar to the first motion, a model motion which has a minimum value, among the averages, and in which a maximum value of the DTW values for each motion feature is a predetermined threshold or less.

Furthermore, in an embodiment, a method of classifying and evaluating a motion based on a motion feature includes obtaining video data by capturing a first motion, obtaining information on locations of joints of the first motion based on the video data, generating motion feature data of the first motion based on the information on the locations of the joints, and calculating a dynamic time warping (DTW) value for each motion feature between the first motion and a specific model motion based on the motion feature data of the first motion and motion feature data of the specific model motion, calculating a score for each motion feature based on the DTW value for each motion feature, and visualizing and representing the scores in a radial chart form.

Furthermore, in an embodiment, an apparatus for classifying and evaluating a motion based on a motion feature includes an image input unit configured to obtain video data by capturing a first motion, a skeleton information extraction unit configured to obtain information on locations of joints of the first motion based on the video data, a motion feature extraction unit configured to generate motion feature data of the first motion based on the information on the locations of the joints, and a motion classification unit configured to select a model motion most similar to the first motion, among a plurality of model motions, based on the motion feature data of the first motion and motion feature data of the plurality of model motions.

In an embodiment, the motion feature data of the first motion and the plurality of model motions may include at least any one of a distance between the locations of the joints and the length of an edge of a bounding box that surrounds a motion subject or a combination of the distance between the locations of the joints and the length of the edge of the bounding box.

In an embodiment, the motion classification unit may calculate similarity for each motion feature with respect to each of the plurality of model motions on the basis of the first motion based on the motion feature data of the first motion and the motion feature data of the plurality of model motions, and may select the model motion most similar to the first motion from the plurality of model motions based on the similarity for each motion feature.

In an embodiment, the motion classification unit may calculate a dynamic time warping (DTW) value of each of the plurality of model motions for each motion feature on the basis of the first motion based on the motion feature data of the first motion and the motion feature data of the plurality of model motions, and may select the model motion most similar to the first motion from the plurality of model motions based on the DTW value for each motion feature.

In an embodiment, after calculating the DTW value for each motion feature, the motion classification unit may calculate an average of the DTW values of each of the plurality of model motions for each motion feature on the basis of the first motion, and may select a model motion having a minimum value, among the averages, as the model motion most similar to the first motion.

In an embodiment, after calculating the DTW value for each motion feature, the motion classification unit may calculate an average of the DTW values of each of the plurality of model motions for each motion feature on the basis of the first motion, and may select, as the model motion most similar to the first motion, a model motion which has a minimum value, among the averages, and in which a maximum value of the DTW values for each motion feature is a predetermined threshold or less.

In an embodiment, the motion classification unit may visualize and represent, in a radial chart form, similarity for each motion feature of each of the plurality of model motions on the basis of the first motion based on the DTW values for each motion feature.

The present disclosure may be applied to various applications for user pose estimation and for indoor sports, home training, posture corrections, and re-activation therapy using the user pose estimation, and has an effect in that a motion can be classified and evaluated efficiently and accurately based on skeleton information of a user.

Furthermore, the present disclosure has an effect in that a user can specifically and easily understand a difference between his or her motion and a target motion and a degree of the difference because a difference between motions can be analyzed and visualized for each motion feature.

Effects of the present disclosure which may be obtained in the present disclosure are not limited to the aforementioned effects, and other effects not described above may be evidently understood by a person having ordinary knowledge in the art to which the present disclosure pertains from the following description.

BRIEF DESCRIPTION OF THE DRAWINGS

FIG. 1 is a diagram relating to human body landmarks for pose estimation.

FIG. 2 is a diagram illustrating an example of motion features which are changed by a movement of an arm.

FIG. 11 is a flowchart for describing a method of classifying and evaluating a motion based on a motion feature.

FIG. 12 is a block diagram illustrating a construction of an apparatus for classifying and evaluating a motion based on a motion feature.

DETAILED DESCRIPTION

Figure 3:
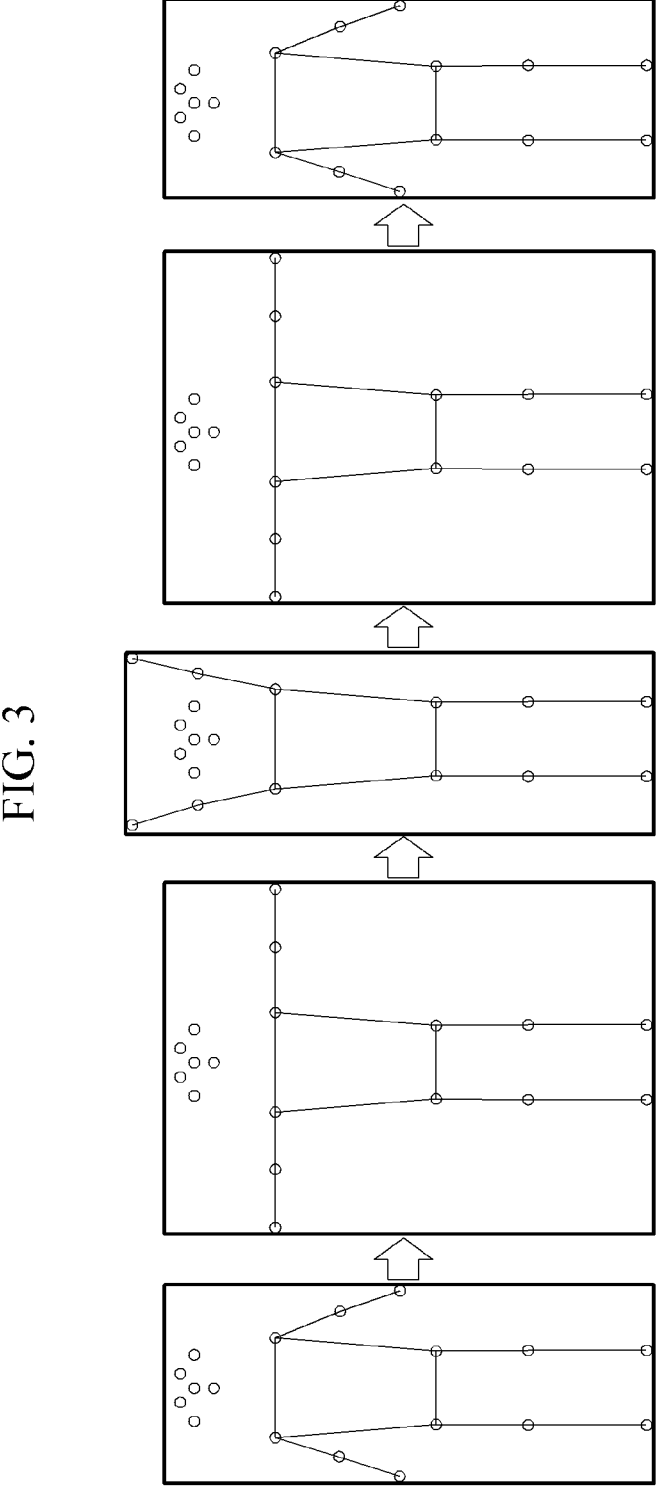
FIG. 3 is a diagram relating to a skeleton change according to a first motion.

Advantages and characteristics of the present disclosure and a method for achieving the advantages and characteristics will become apparent from the embodiments described in detail later in conjunction with the accompanying drawings. However, the present disclosure is not limited to the disclosed embodiments, but may be implemented in various different forms. The embodiments are merely provided to complete the present disclosure and to fully notify a person having ordinary knowledge in the art to which the present disclosure pertains of the category of the present disclosure. The present disclosure is merely defined by the category of the claims. Terms used in this specification are used to describe embodiments and are not intended to limit the present disclosure. In this specification, an expression of the singular number also includes an expression of the plural number unless clearly defined otherwise in the context. The term "comprises" and/or "comprising" used in this specification does not exclude the presence or addition of one or more other components, steps, operations and/or elements in addition to mentioned components, steps, operations and/or elements.

In describing the present disclosure, a detailed description of a related known technology will be omitted if it is deemed to make the subject matter of the present disclosure unnecessarily vague.

Hereinafter, embodiments of the present disclosure are described in detail with reference to the accompanying drawings. In describing the present disclosure, in order to facilitate general understanding of the present disclosure, the same reference numeral is used for the same mean regardless of the reference numeral.

FIG. 1 is a diagram relating to human body landmarks for pose estimation (data: https://google.github.io/mediapipe/solutions/pose.html). In general, human body landmarks for pose estimation are illustrated in FIG. 1. A skeleton structure (hereinafter may be referred to as "skeleton information") of a user that is included in an image may be obtained by using landmarks except landmarks in the user's face, that is, joints of the body of the user as key points and interconnecting the key points.

Furthermore, in order to recognize a motion of the user based on the skeleton information, a method of comparing a model motion and a location of each joint included in the skeleton information of the user or comparing changes in the motions of each joint over time by tracking a movement path of each joint on the basis of location coordinates of each joint, on the basis of a model motion for each motion, is used. However, since an error may occur depending on differences between body types and motion execution speeds, a skeleton normalization and time normalization process is essentially required in order to apply the aforementioned method.

Figure 2:
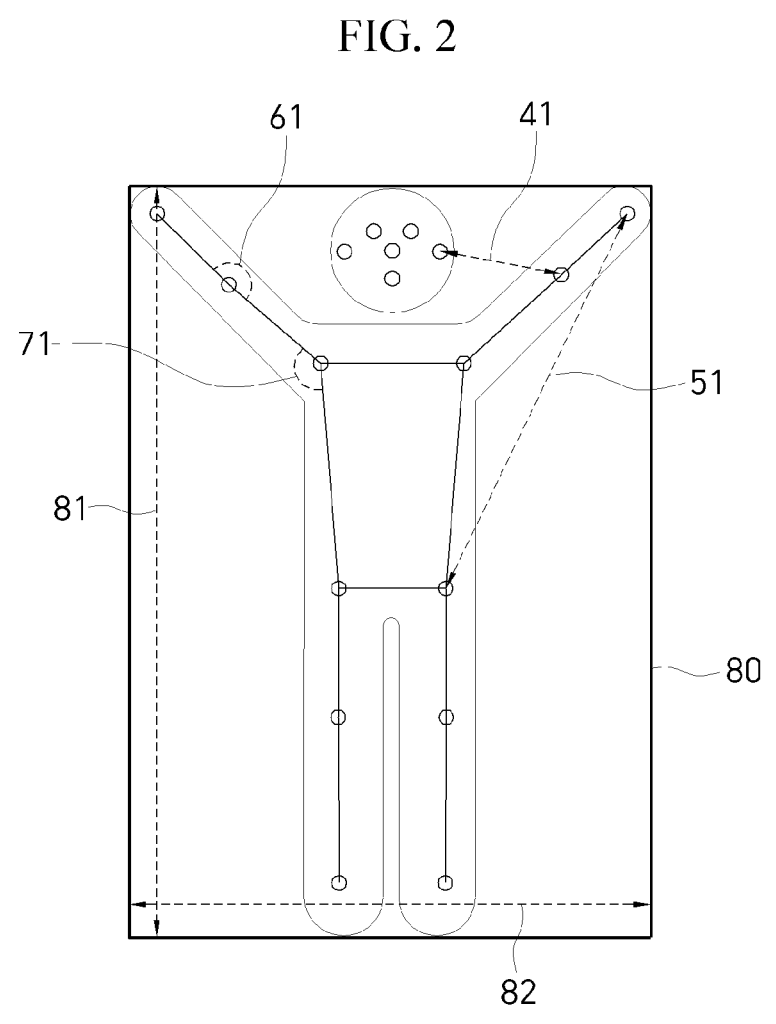

The present disclosure proposes a method of analyzing a motion based on a motion feature which may be obtained from each piece of skeleton information and classifying and evaluating a motion, instead of comparing locations of joints or tracking a movement path of a joint. For example, as in FIG. 2, in a movement of an upper body (e.g., an arm), motion features which may be obtained from skeleton information may include an ear-elbow distance 41 (two types on the left and right, that is, a distance between a right ear and a right elbow and a distance between a left ear and a left elbow), a wrist-hip distance 51 (two types on the left and right, that is, a distance between a right wrist and a right hip and a distance between a left wrist and a left hip), an elbow angle 61 (two types on the left and right, that is, a right elbow angle and a left elbow angle), an armpit angle 71 (two types on the left and right, that is, a right armpit angle and a left armpit angle), and the sizes of a body bounding box 80 (vertical length 81 and horizontal length 82, that is, a bounding box-vertical length and a bounding box-horizontal length). The motion features defined in the example of FIG. 2 may be arranged as in Table 1.

In an embodiment of the present disclosure, two motions that are specifically performed by a user are defined as follows. Thereafter, a change in the skeleton and a change in the motion feature according to the two motions of the user are described.

1) Both arms are straightened, lifted above the head, and then gotten off (a first motion)
  2) With both arms bent upward at an angle of 90°, both arms are straightened above the head, and then gotten off while bent at an angle of 90° again (a second motion)

Figure 4A:
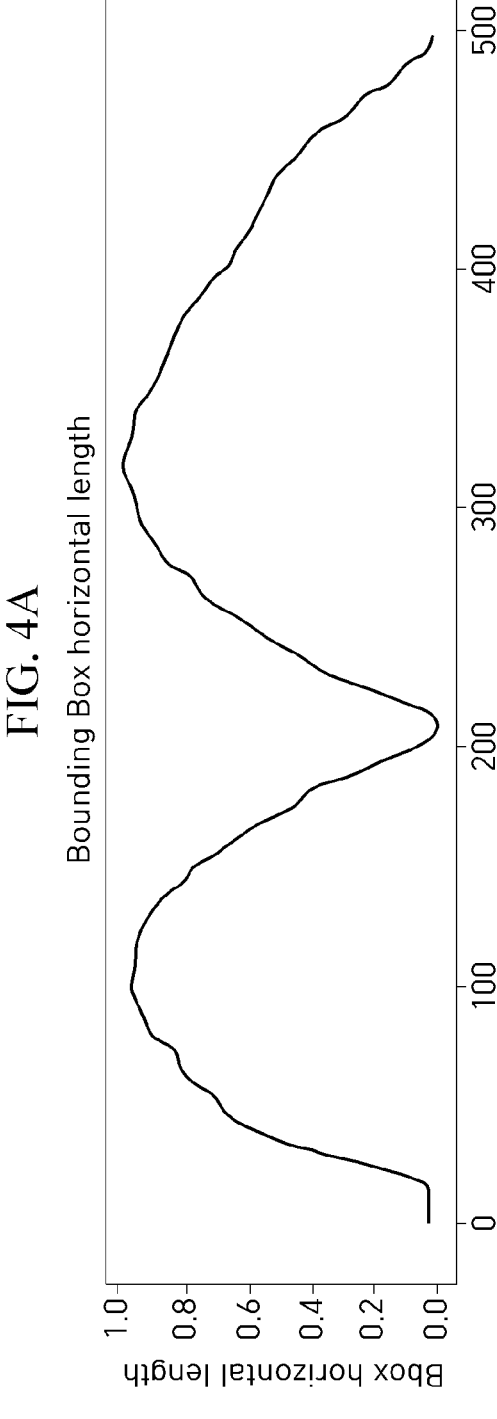
FIGS. 4A to 4J are motion feature change graphs according to the first motion.
Figure 4B:
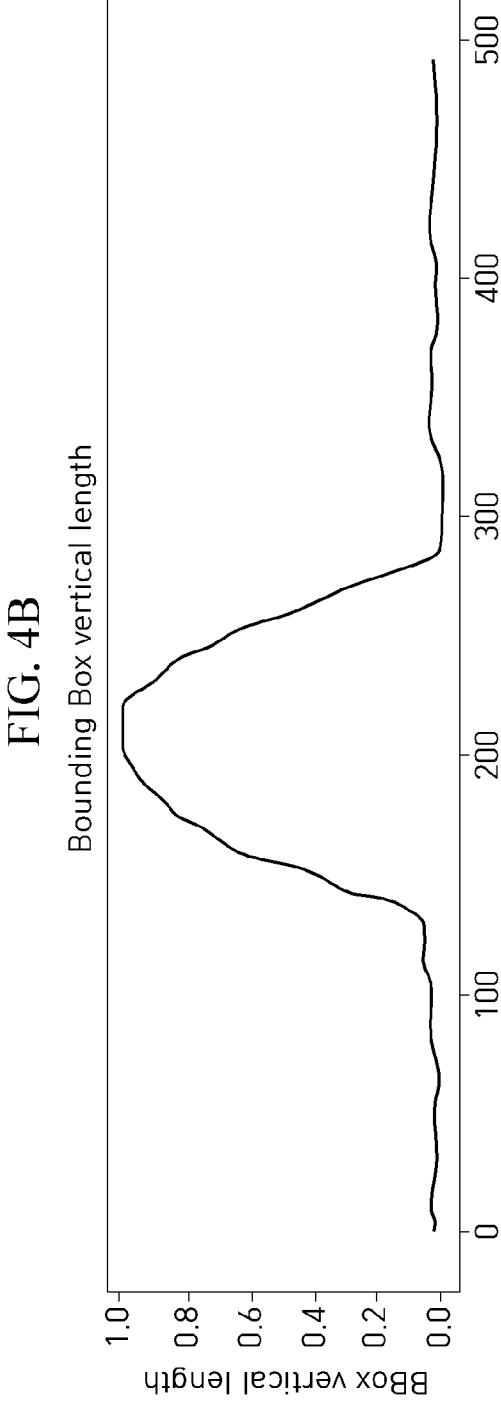
Figure 4C:
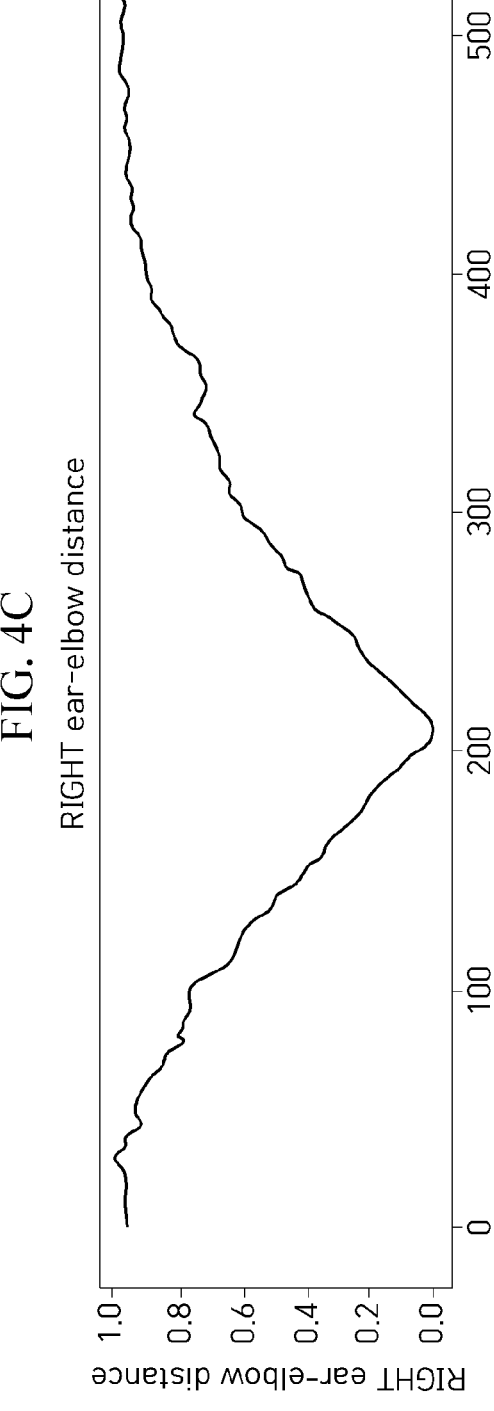
Figure 4D:
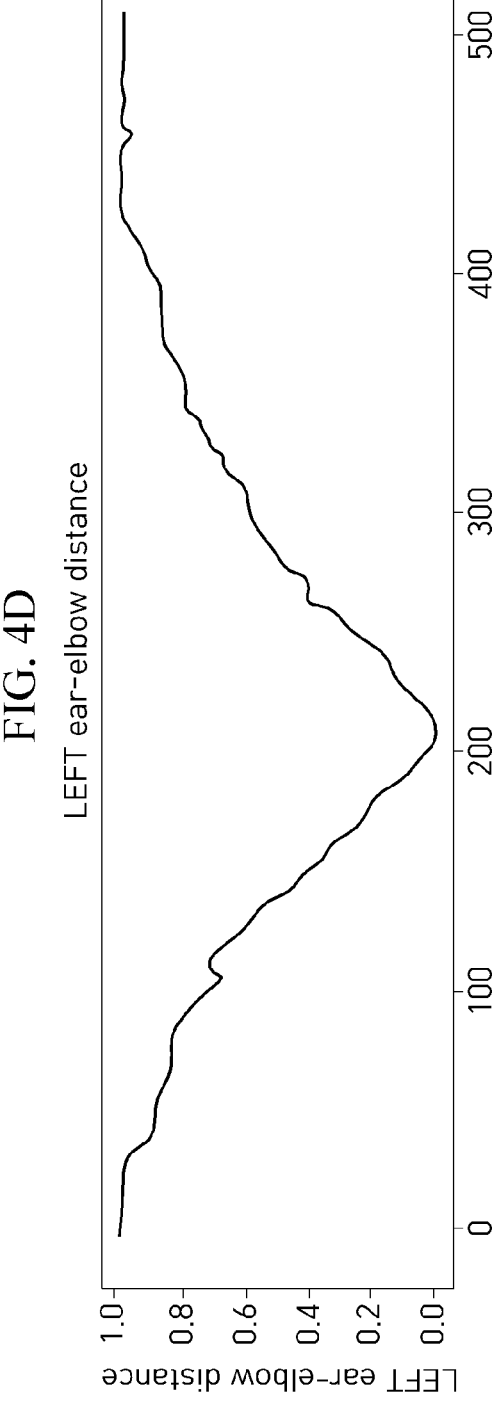
Figure 4E:
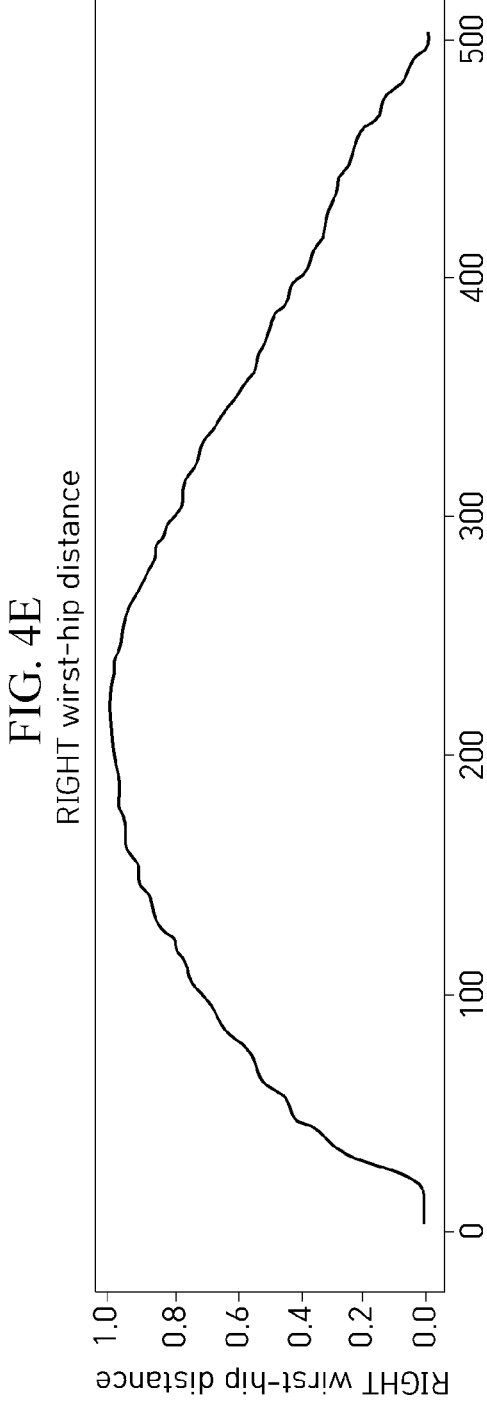
Figure 4F:
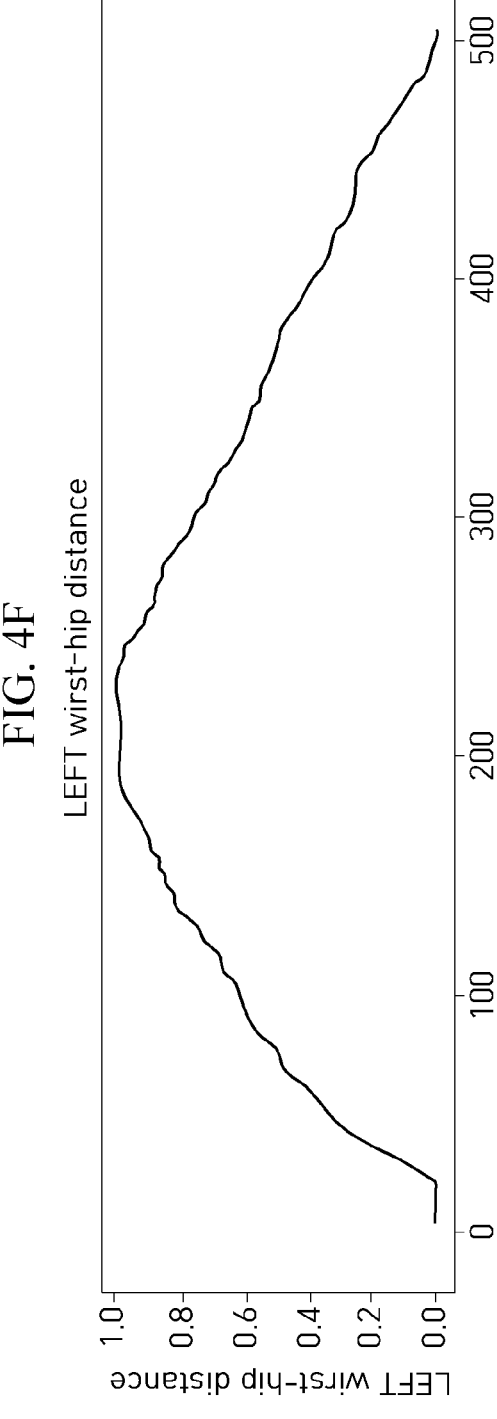
Figure 4G:
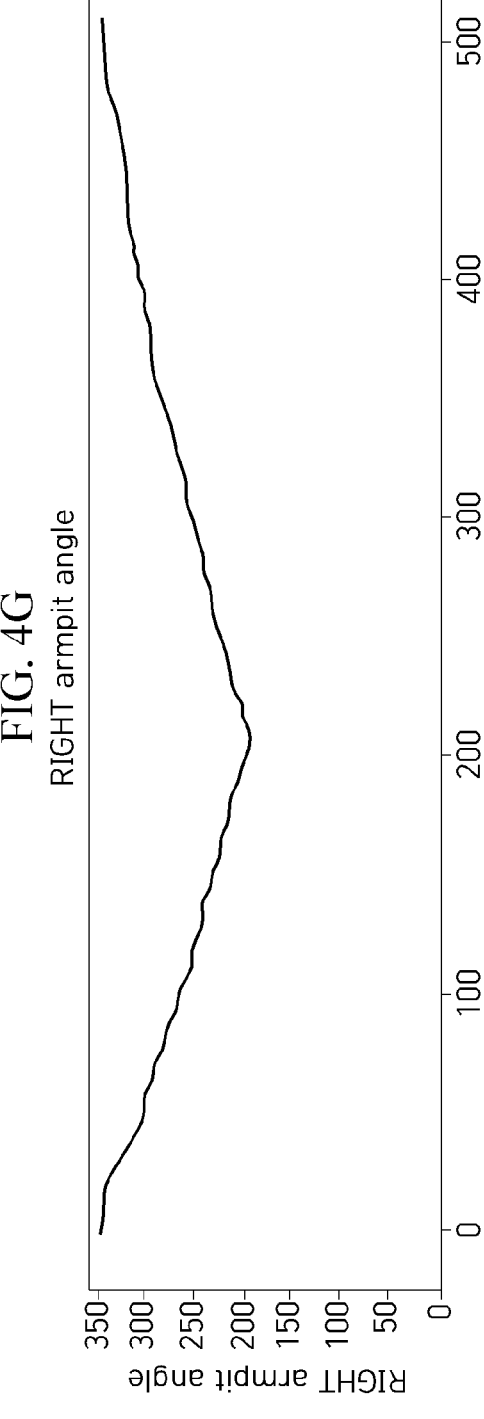
Figure 4H:
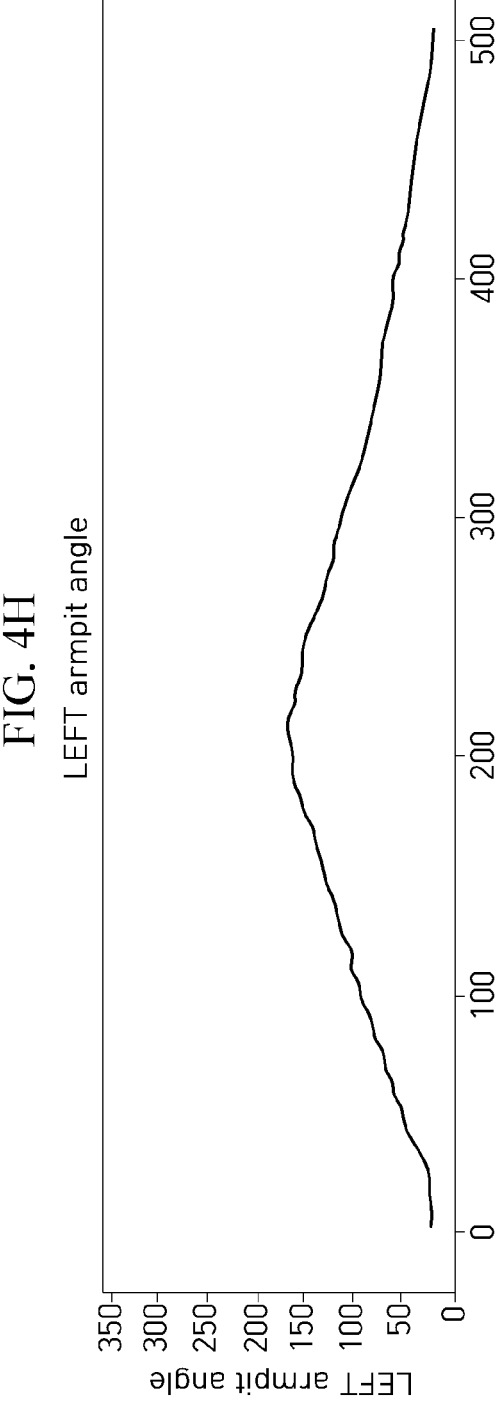
Figure 4I:
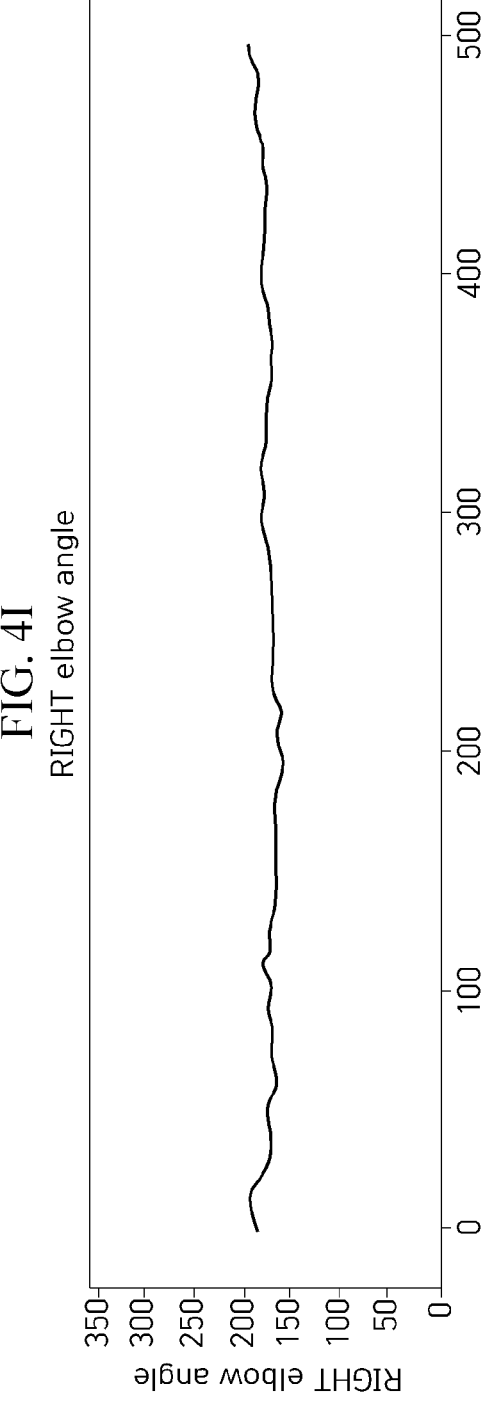
Figure 4J:
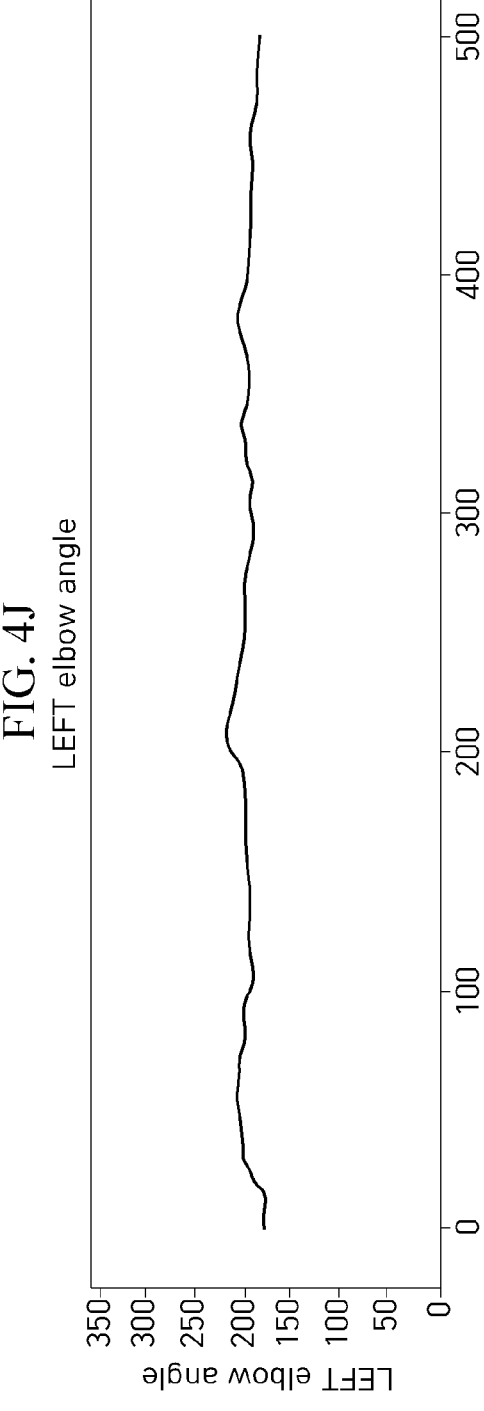

FIG. 3 illustrates that a change in the skeleton over time with respect to the first motion is basically divided into five stages and the five stages are arranged in order of time. FIGS. 4A to 4J represent changes in the ten motion features (a) to (j) that have been defined in FIG. 2 with respect to the first motion in the form of graphs. For example, FIG. 4A represents, in the form of a graph, a change in the motion feature (a) with respect to the first motion. FIG. 4J represents, in the form of a graph, a change in the motion feature (j) with respect to the first motion.

As illustrated in FIGS. 3 and 4A to 4J, changes in the motion features for the first motion are described below. (a) The bounding box-horizontal length shows a trend in which the bounding box-horizontal length is increased (widened)-decreased (narrowed)-increased-decreased. (b) The bounding box-vertical length is not changed for a certain time, increased after both arms are held up above the head and then decreased. Thereafter, the bounding box-vertical length maintains a constant state. Based on such a principle, it may be seen that the ear-elbow distance ((c), (d)) is decreased and then increased, the wrist-hip distance ((e), (f)) is increased and then decreased, the armpit angle ((g), (h)) is changed from 360° (zero) to 180° and then becomes 360° (zero) again, and the elbow angle ((i), (j)) is constant at an angle of 180°.

Figure 5:
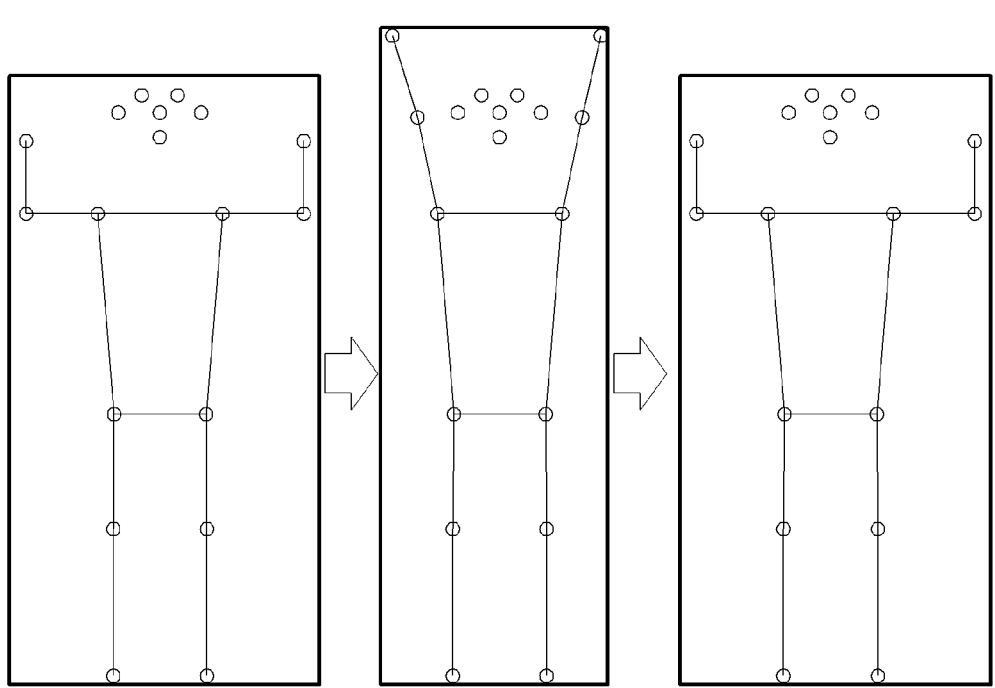
FIG. 5 is a diagram relating to a skeleton change according to a second motion.
Figure 6A:
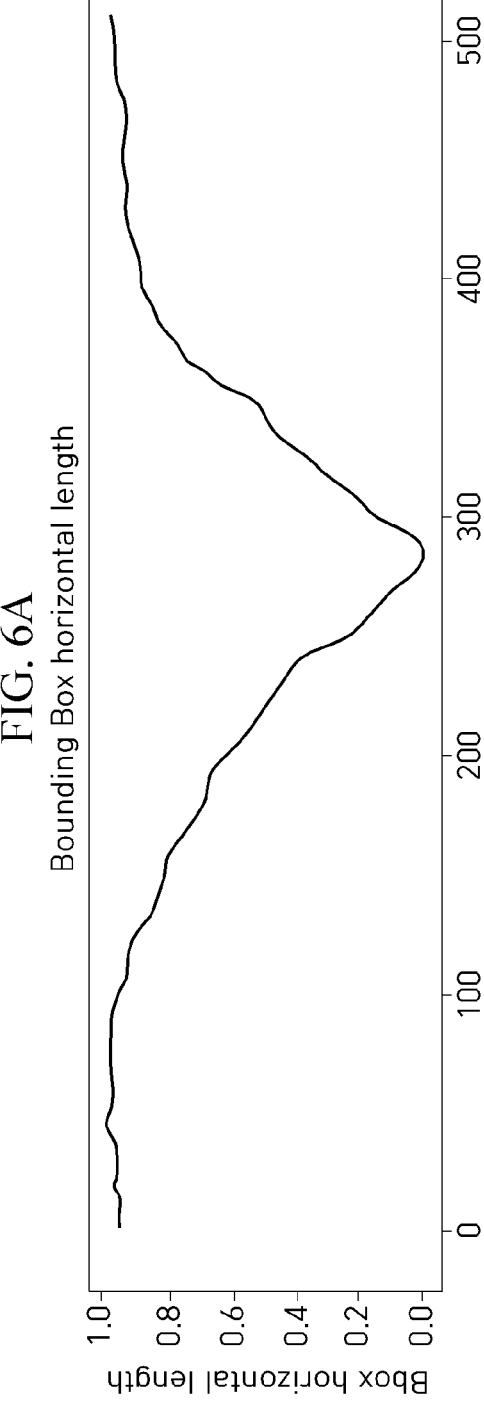
FIGS. 6A to 6J are motion feature change graphs according to the second motion.
Figure 6B:
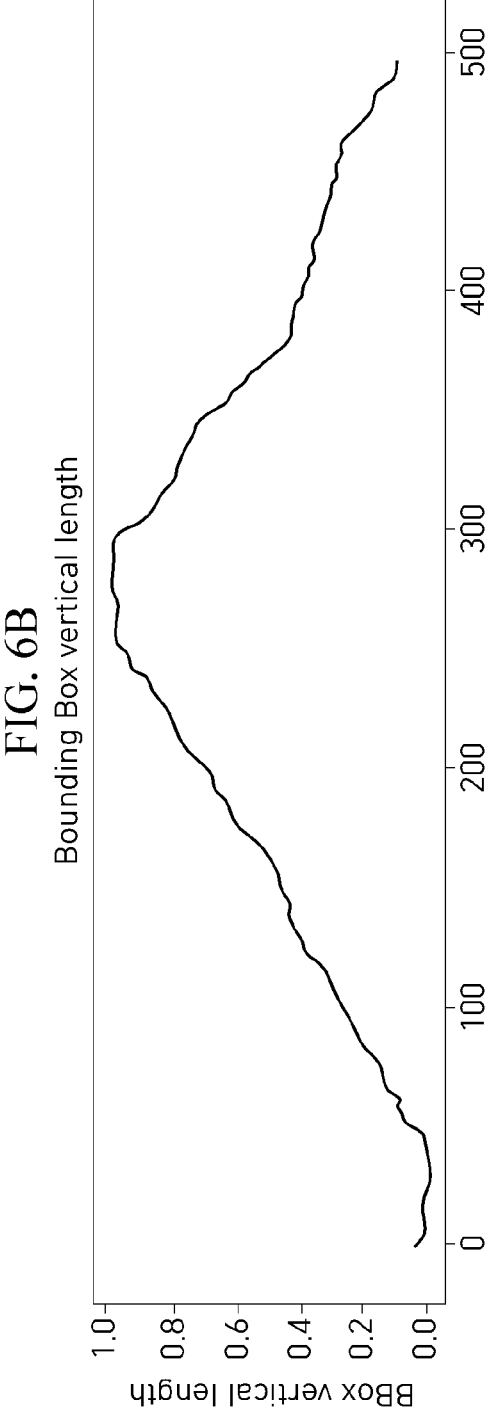
Figure 6C:
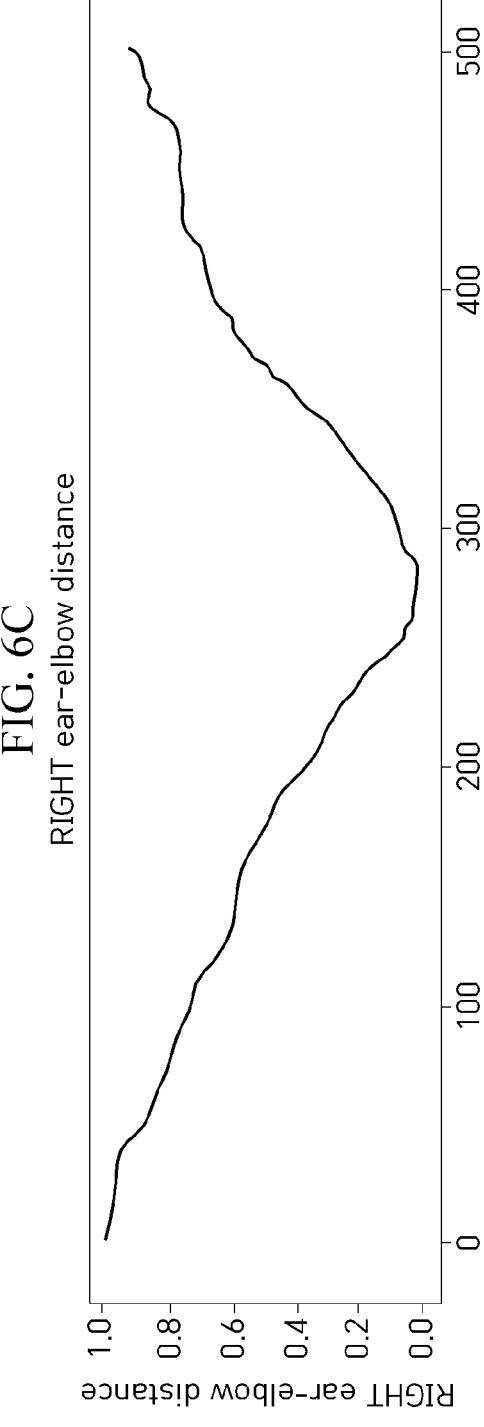
Figure 6D:
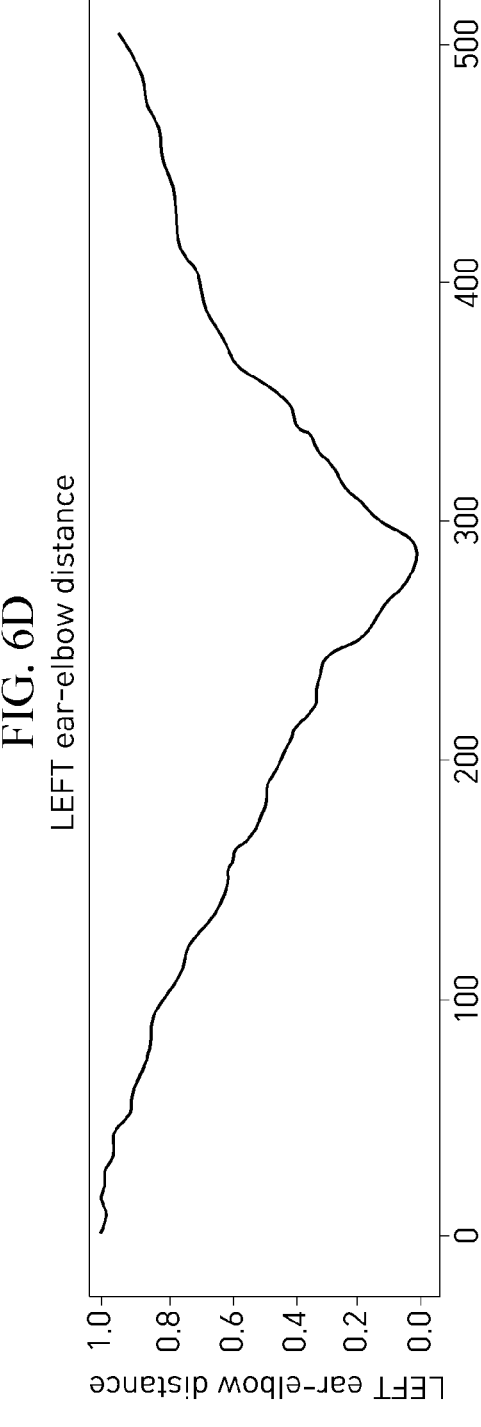
Figure 6E:
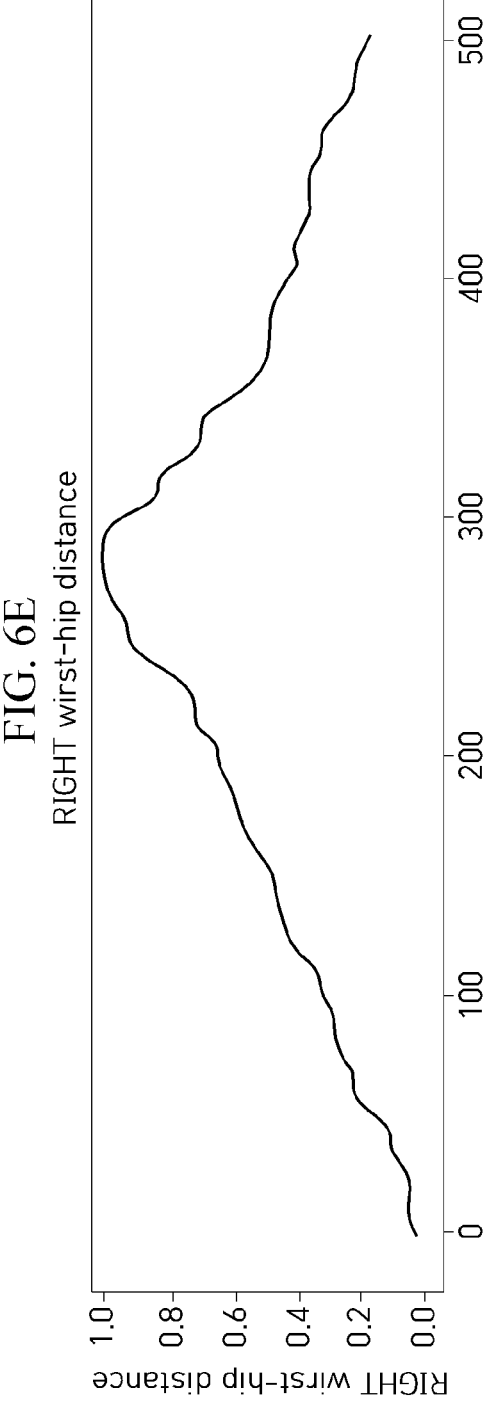
Figure 6F:
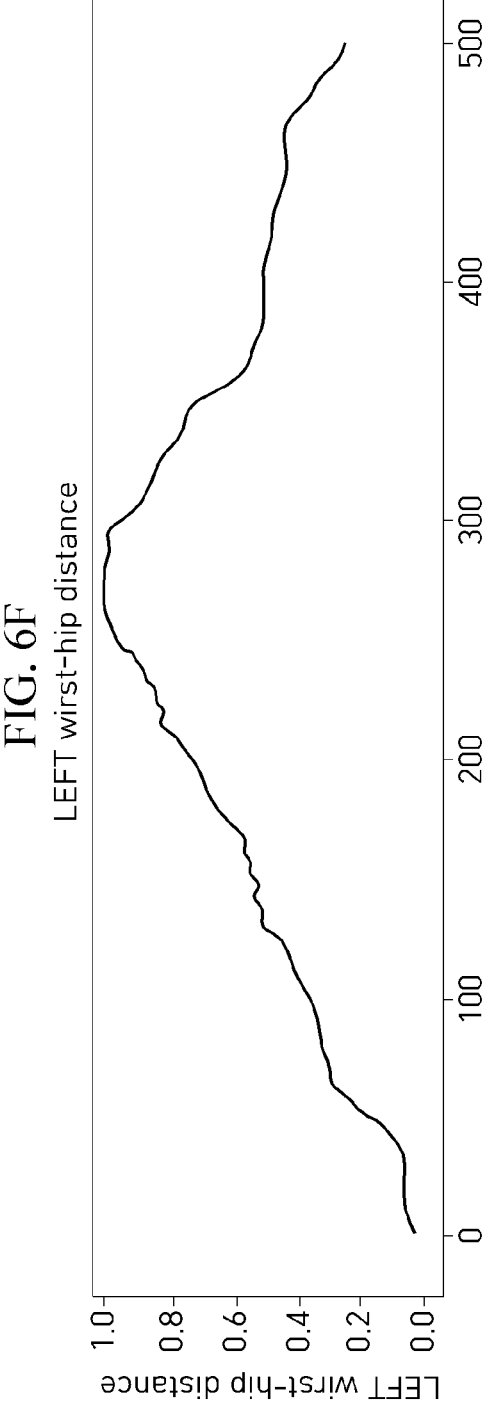
Figure 6G:
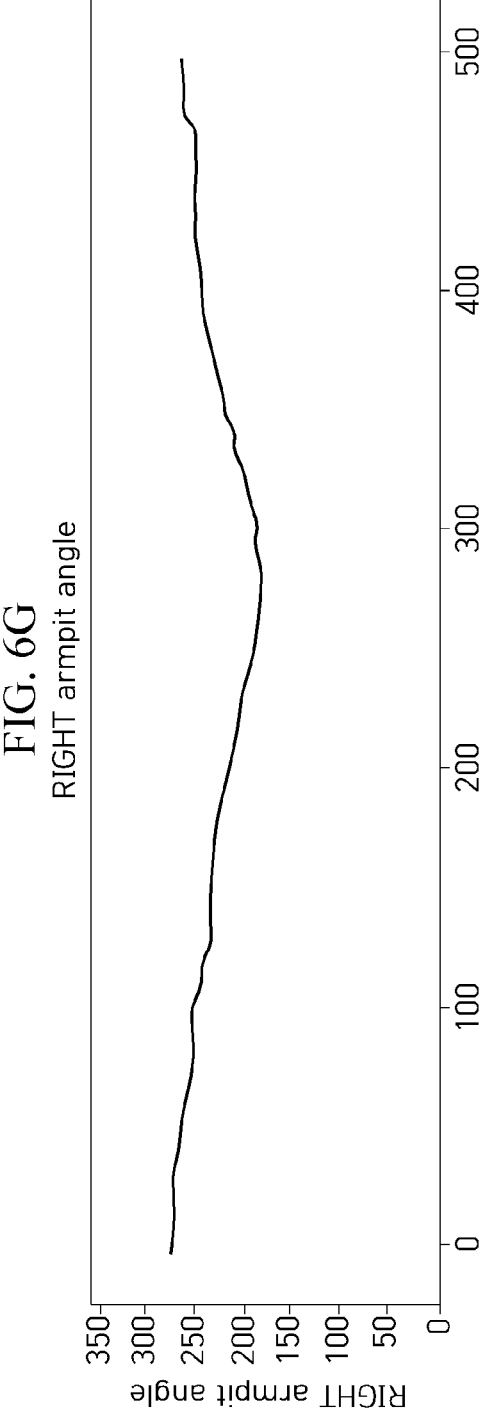
Figure 6H:
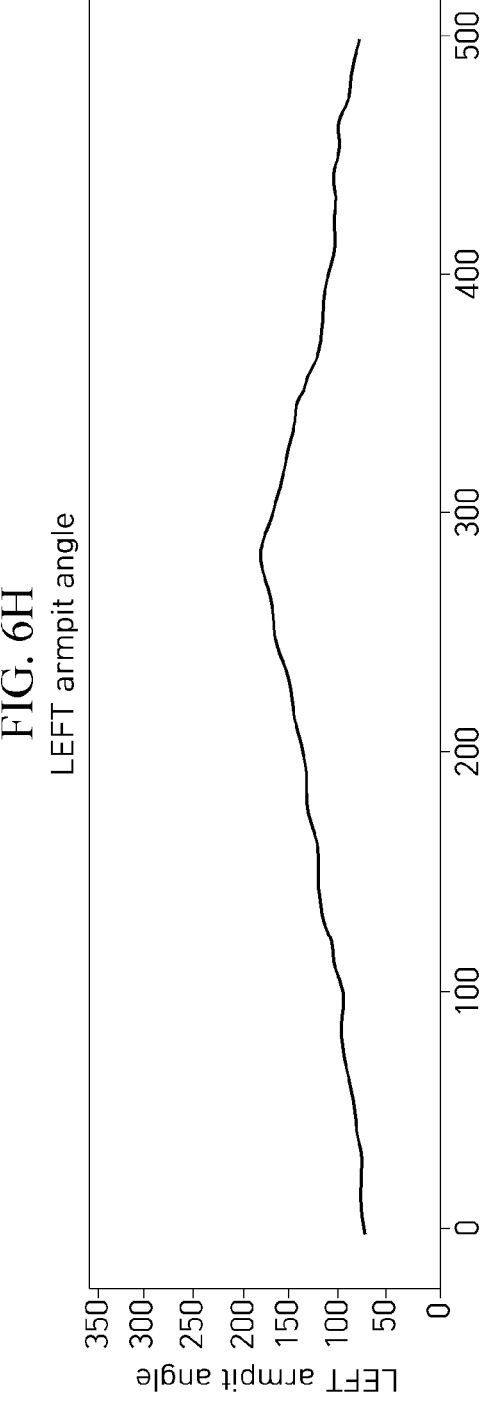
Figure 6I:
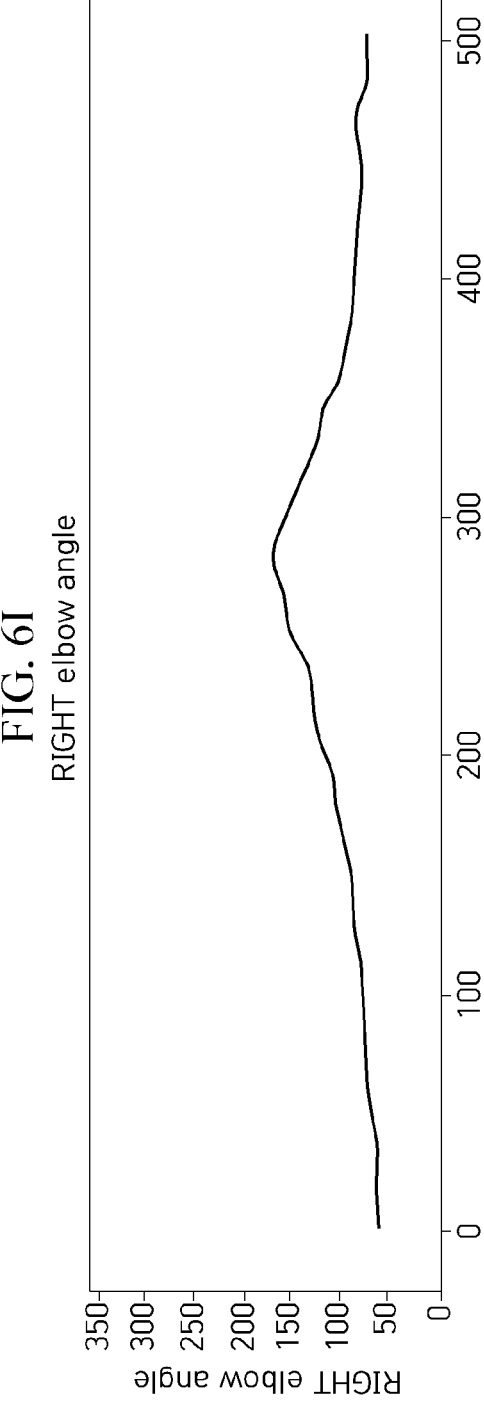
Figure 6J:
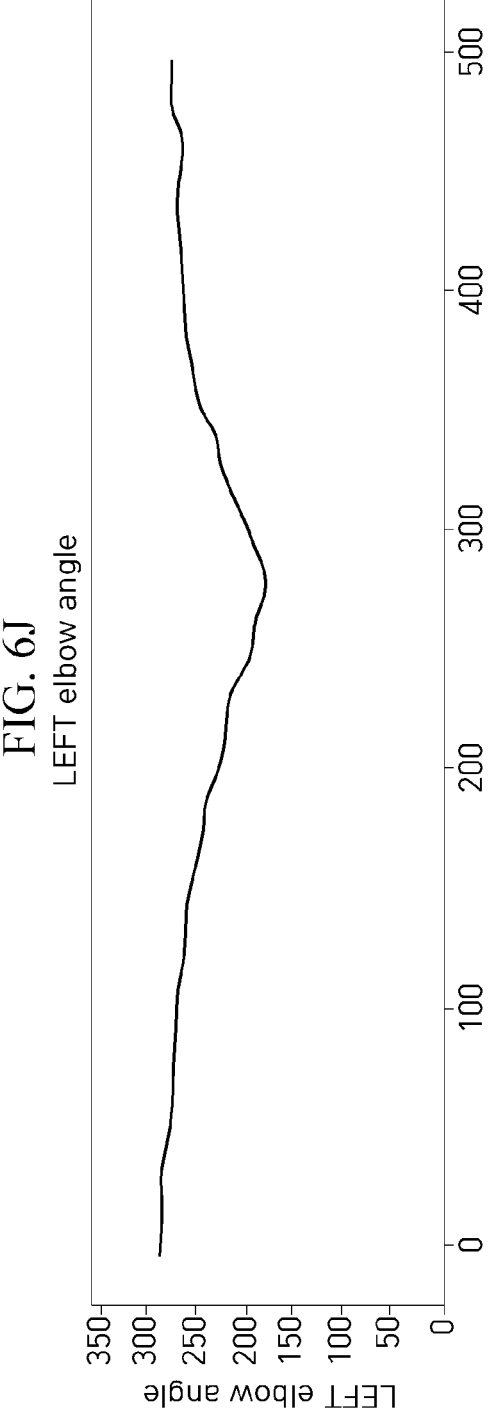

FIG. 5 illustrates that a change in the skeleton over time with respect to the second motion is basically divided into three stages and the three stages are arranged in order of time. FIGS. 6A to 6J represent, in the form of a graph, changes in the ten motion features ((a) to (j)) that have been defined in FIG. 2 with respect to the second motion. For example, FIG. 6A represents a change in the motion feature (a) in the form of a graph with respect to the second motion. FIG. 6J represents a change in the motion feature (j) in the form of a graph with respect to the second motion.

As illustrated in FIGS. 5 and 6A to 6J, changes in the motion features for the second motion are described below. It may be seen that (a) the bounding box-horizontal length is decreased and then increased, (b) the bounding box-vertical length is increased and then decreased, the ear-elbow distance ((c), (d)) is decreased and then increased, the wrist-hip distance ((e), (f)) is increased and then decreased, the armpit angle ((g), (h)) is changed from 270° (90°) to 180° and then becomes 270° (90°) again, and the elbow angle ((i), (j)) is changed from 90° (270°) to 180° and then becomes 90° (270°) again.

When the graphs of FIGS. 4A to 4J and 6A to 6J are compared for each motion feature, it may be seen that the graphs of the first motion and the second motion have different forms with respect to each motion feature. The method and apparatus for classifying and evaluating a motion according to embodiments of the present disclosure classify and evaluate a motion of a user by comparing forms of the graphs for the motion features.

FIGS. 7A to 7J and 8A to 8J are motion feature change graphs for the same motion (i.e., the first motion). For

TABLE 1

Figure 7A:
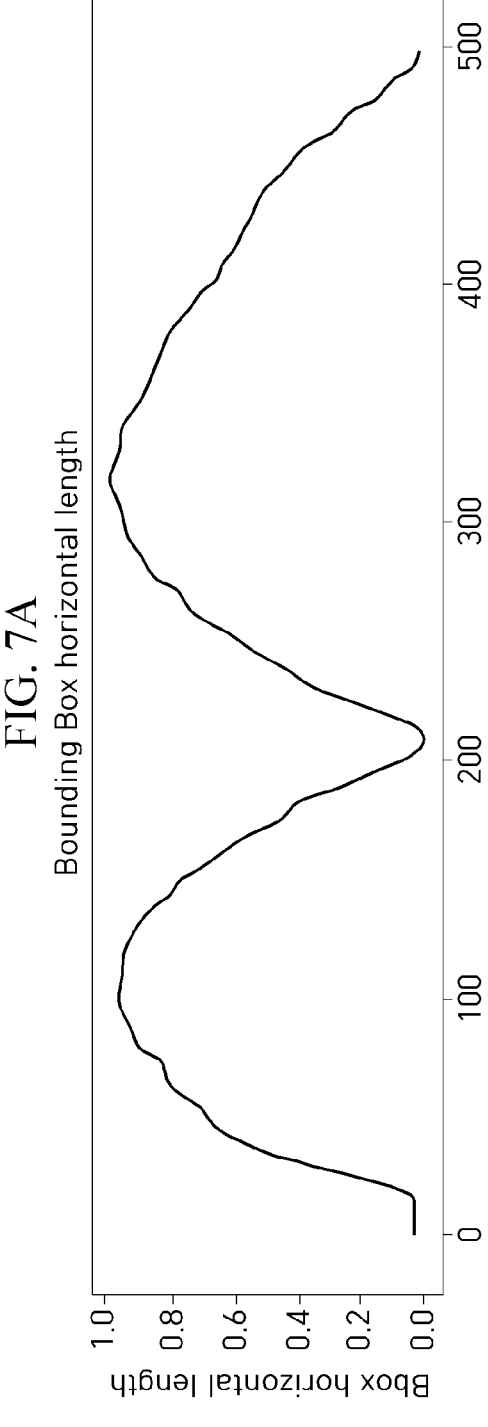
FIGS. 7A to 7J and 8A to 8J are motion feature change graphs according to the same motion (i.e., the first motion).
Figure 7B:
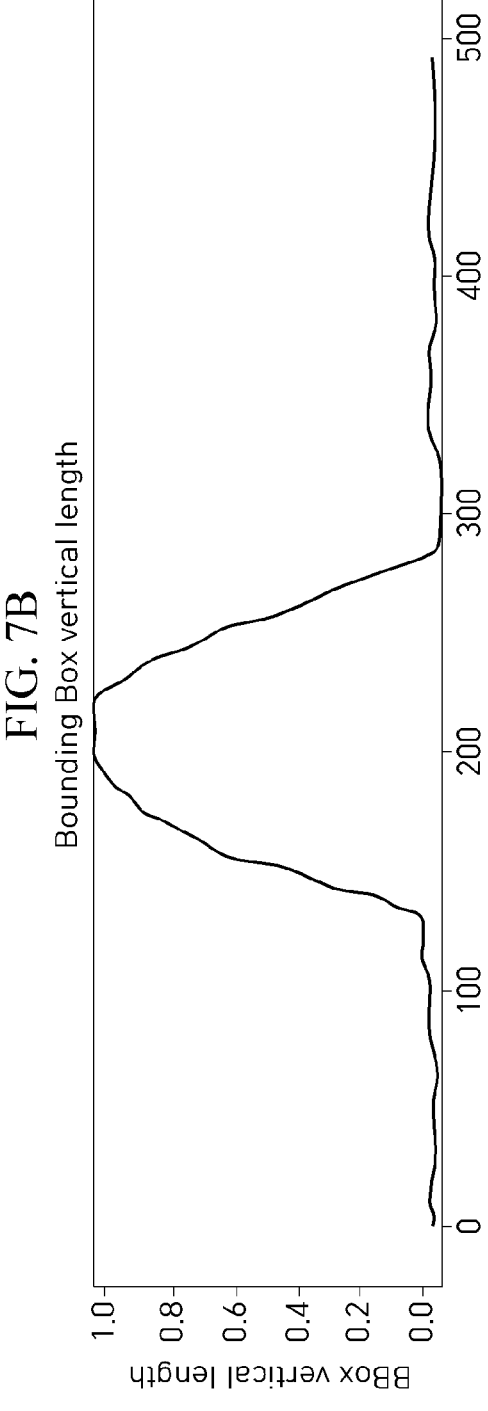
Figure 7C:
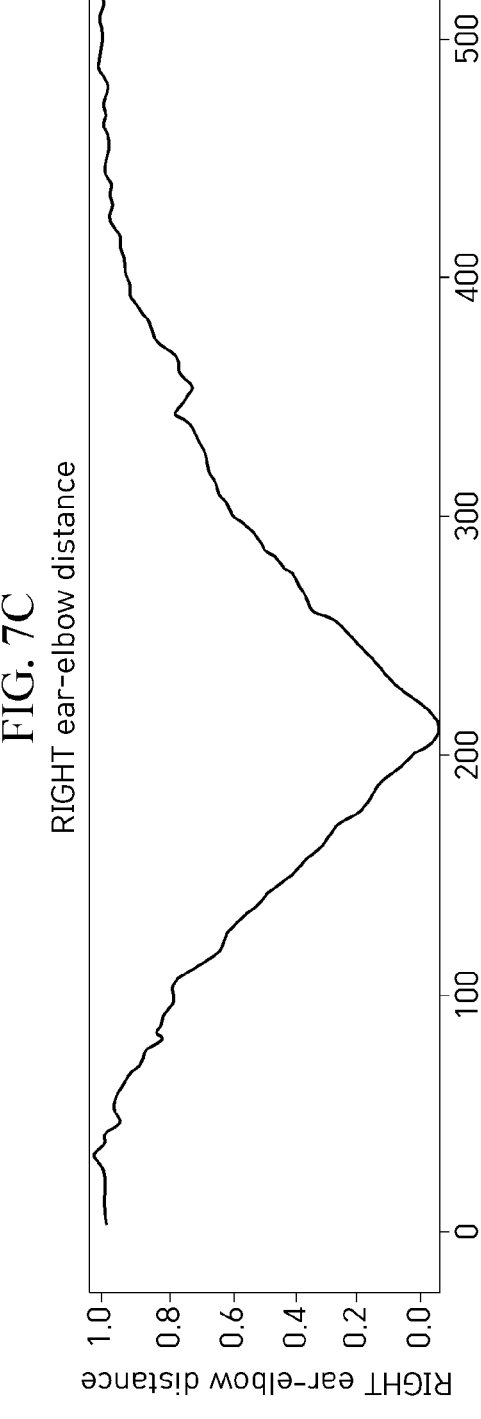
Figure 7D:
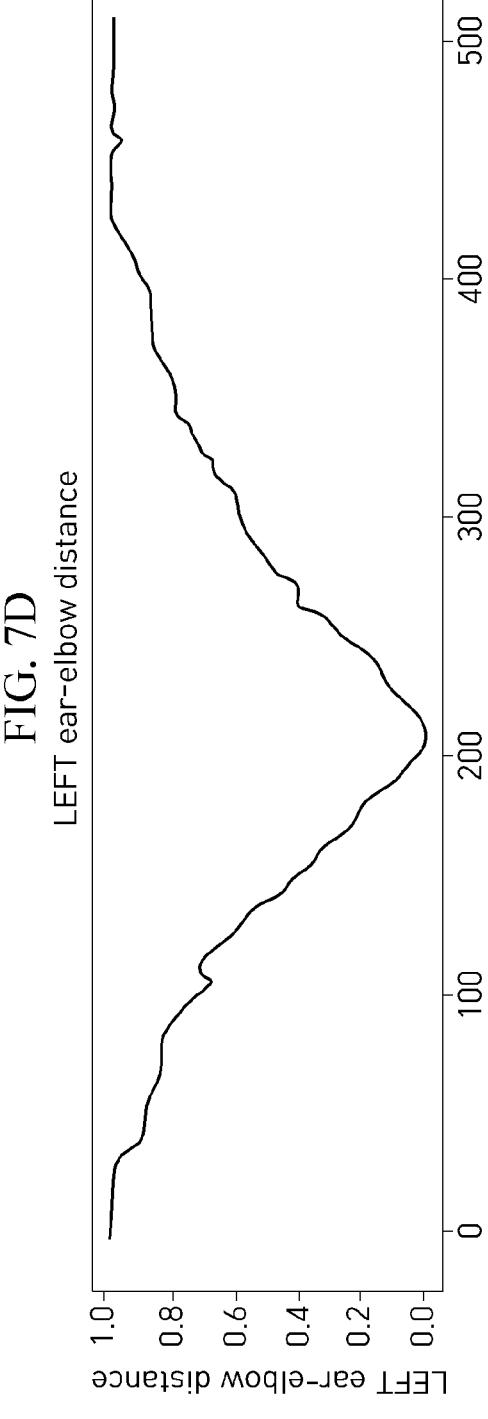
Figure 7E:
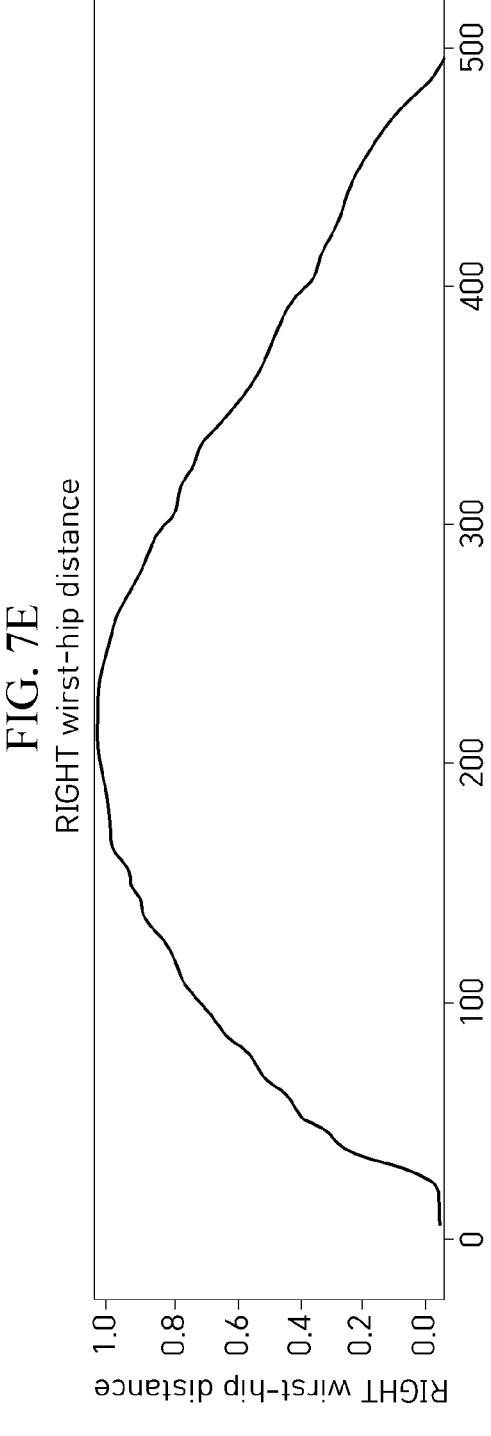
Figure 7F:
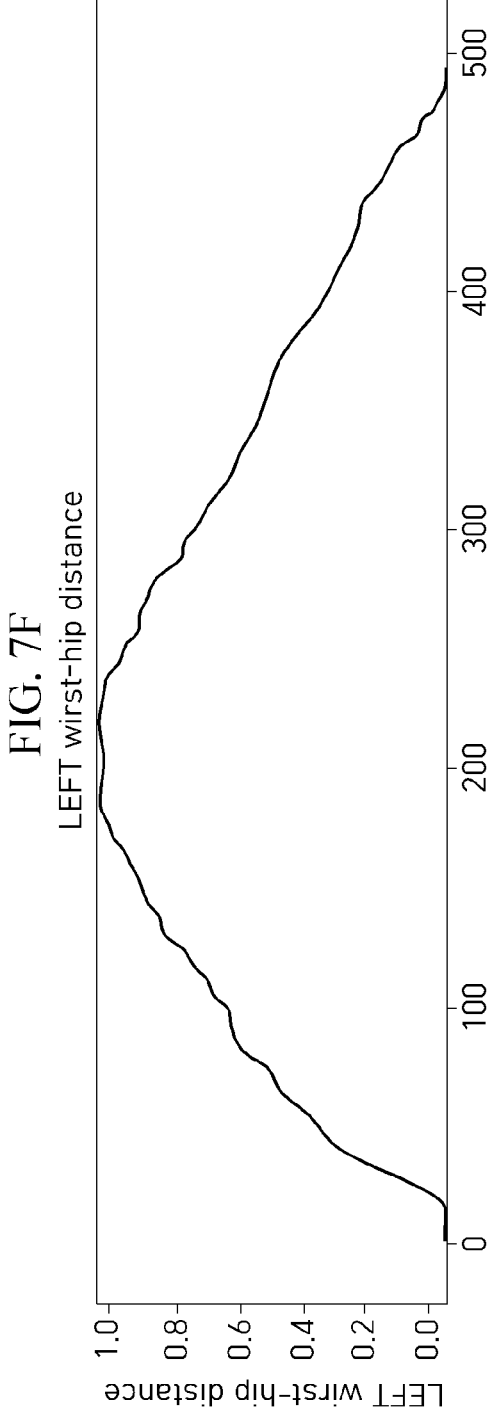
Figure 7G:
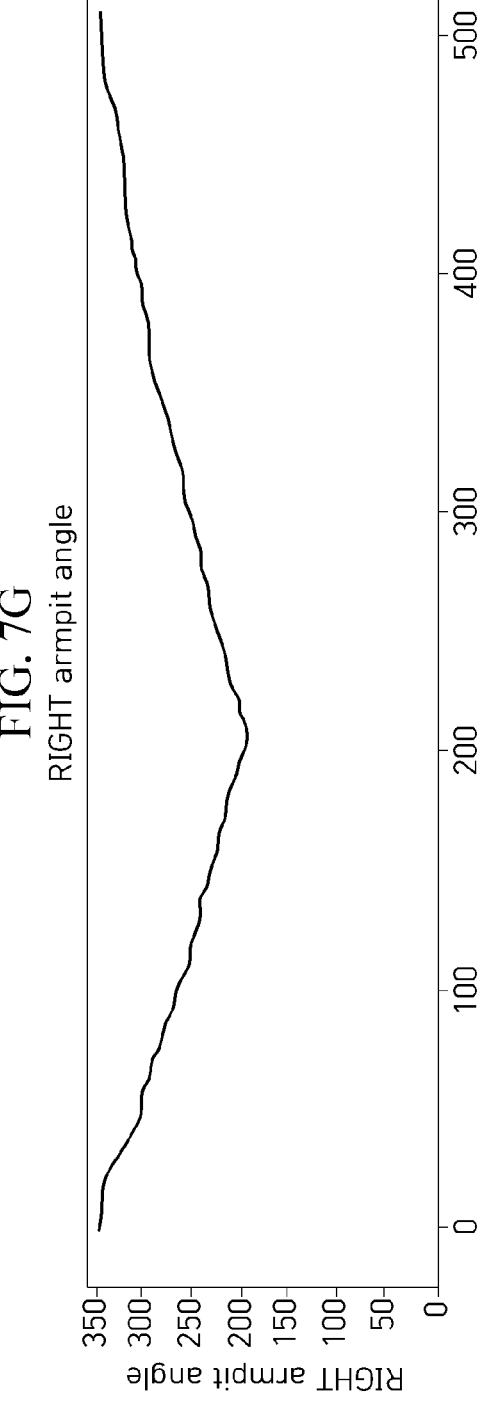
Figure 7H:
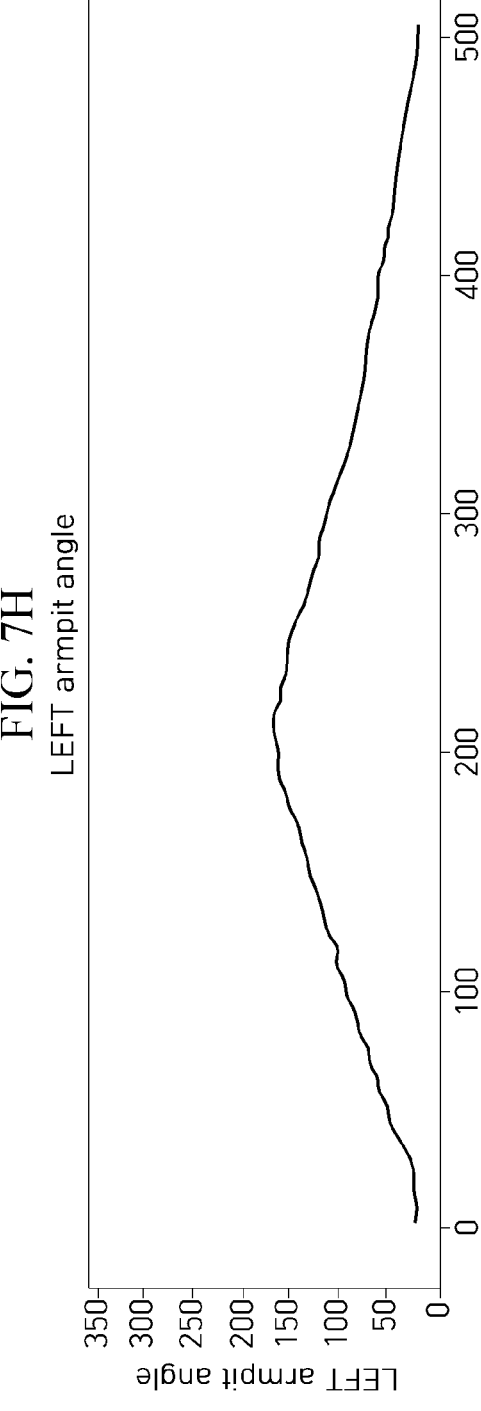
Figure 7I:
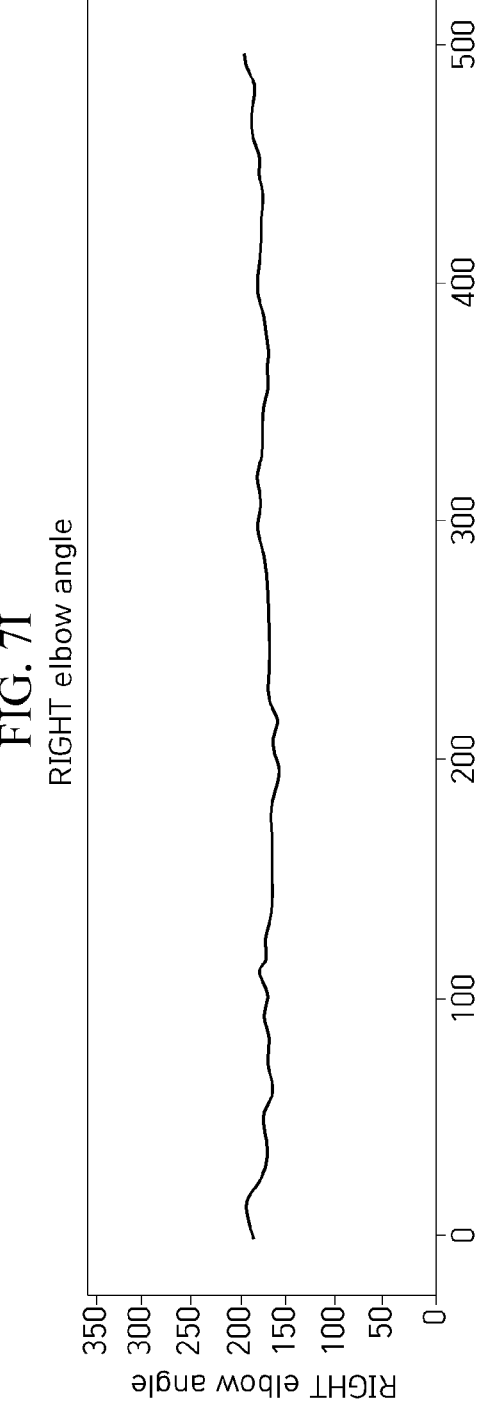
Figure 7J:
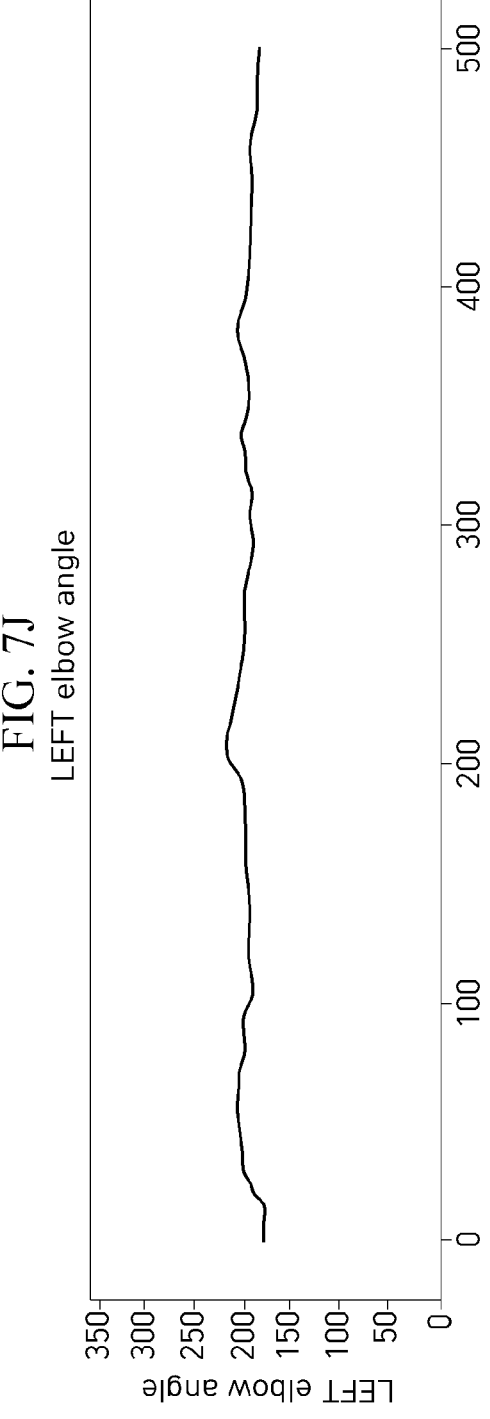
Figure 8A:
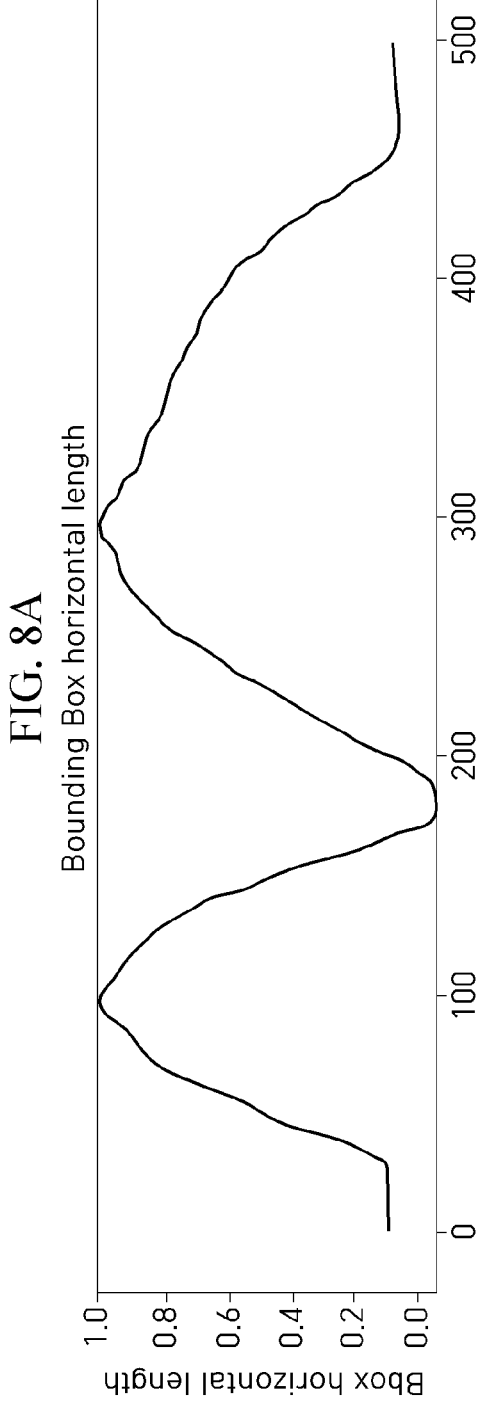
Figure 8B:
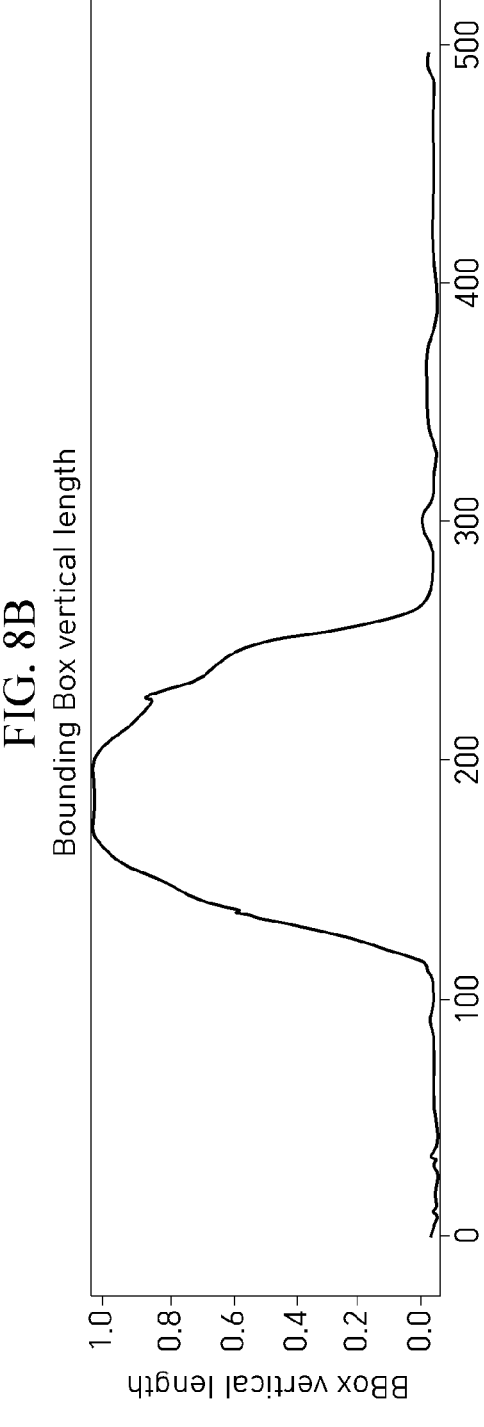
Figure 8C:
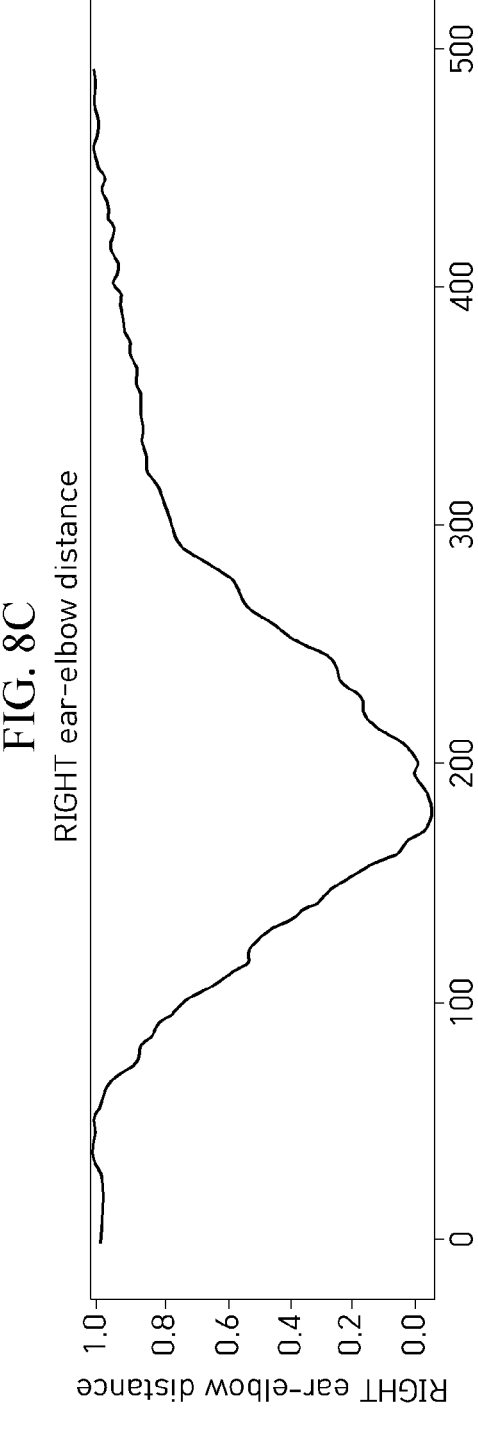
Figure 8D:
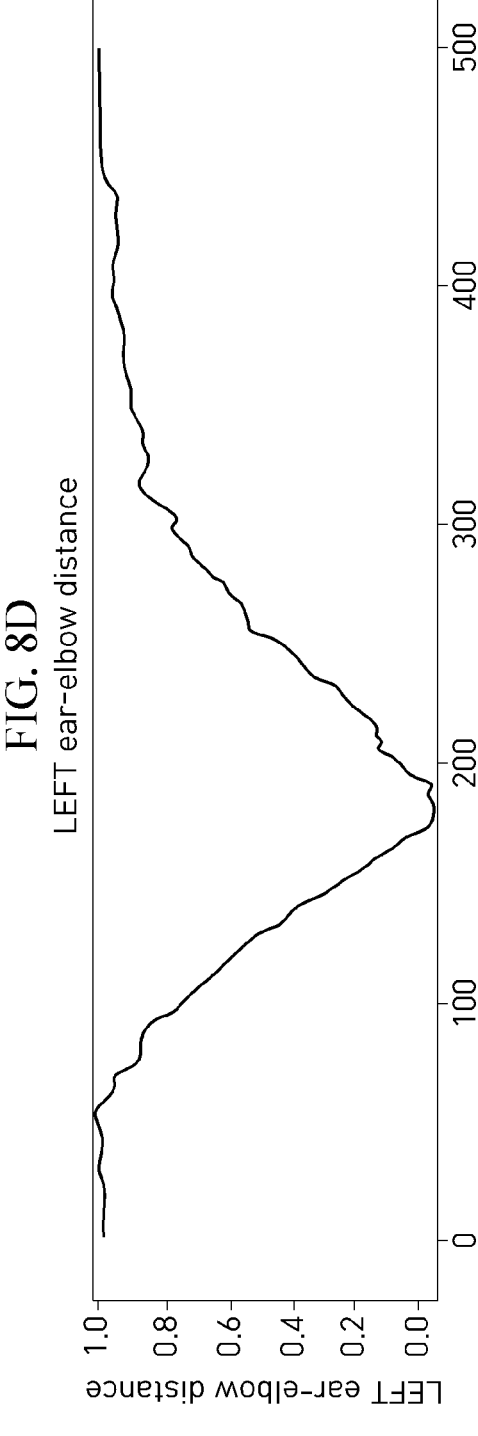
Figure 8E:
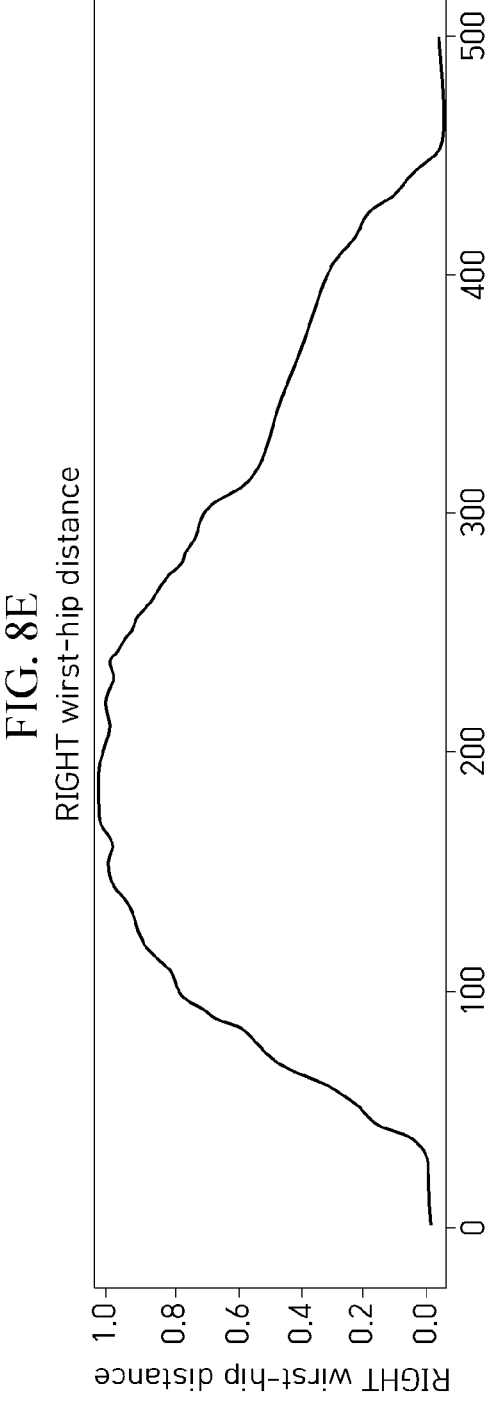
Figure 8F:
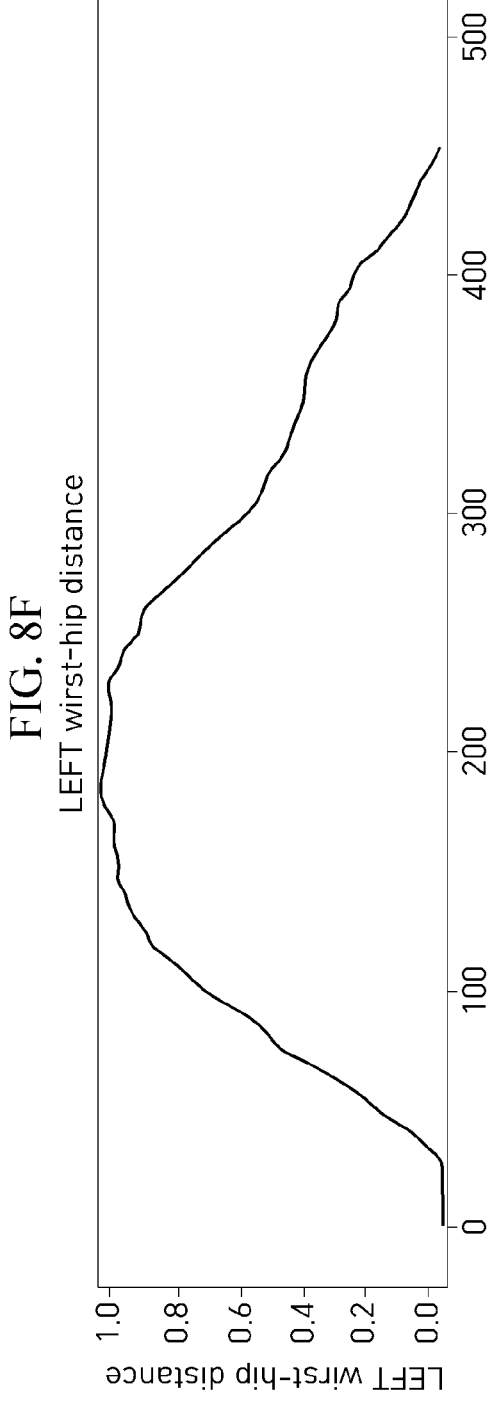
Figure 8G:
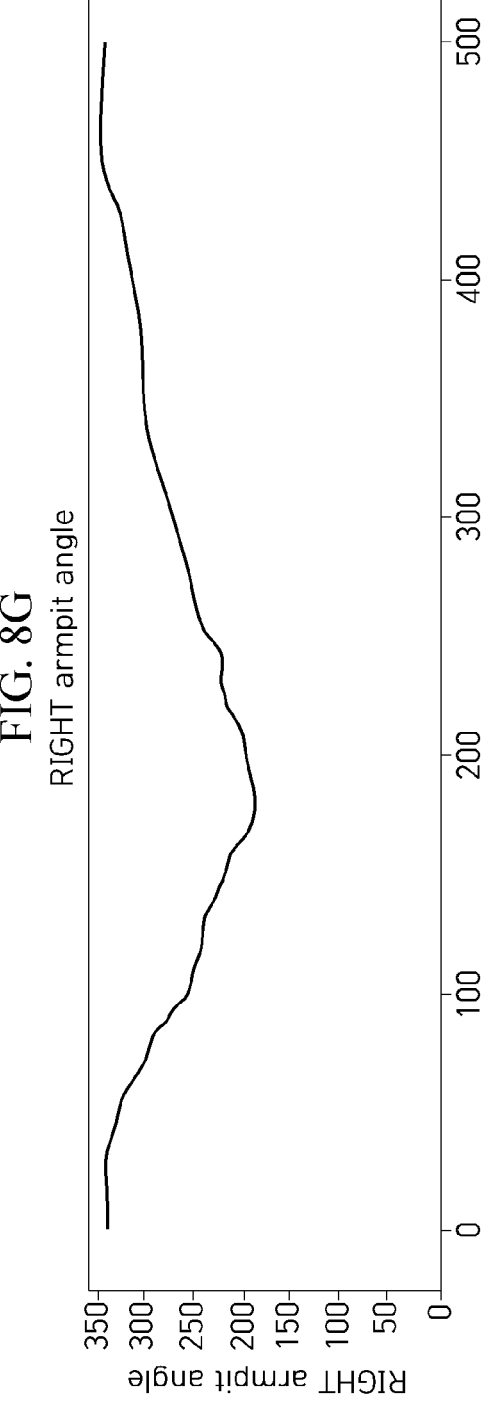
Figure 8H:
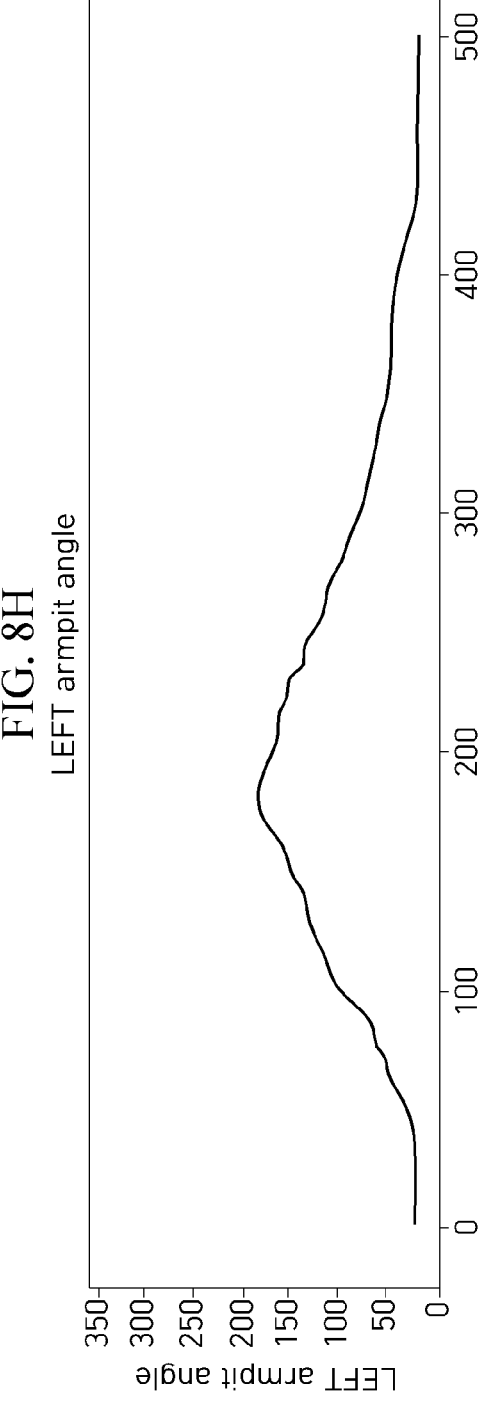
Figure 8I:
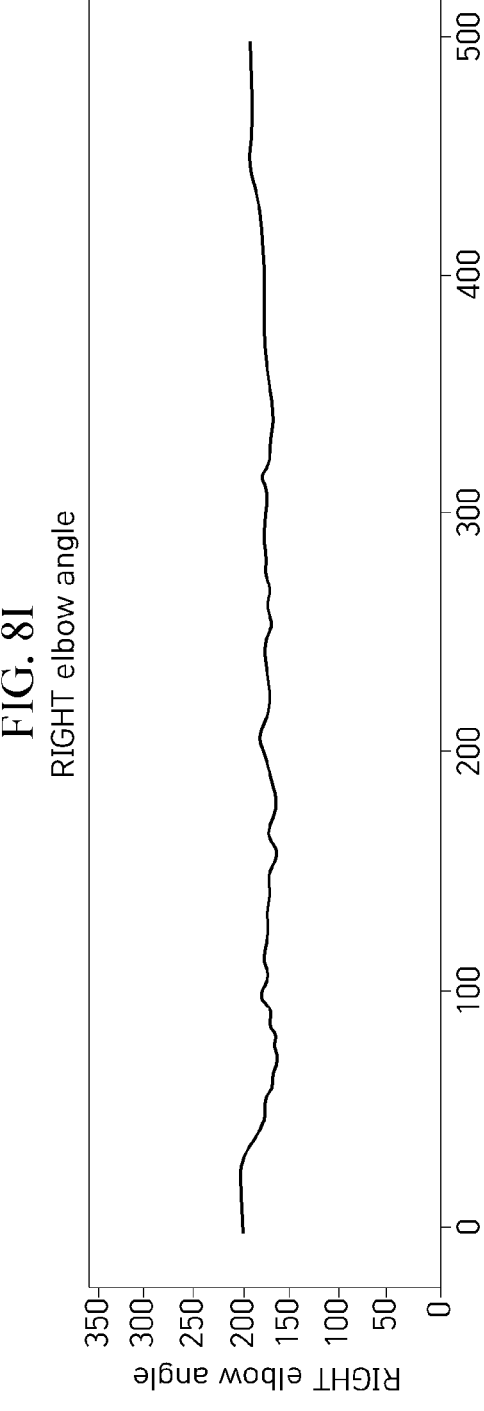
Figure 8J:
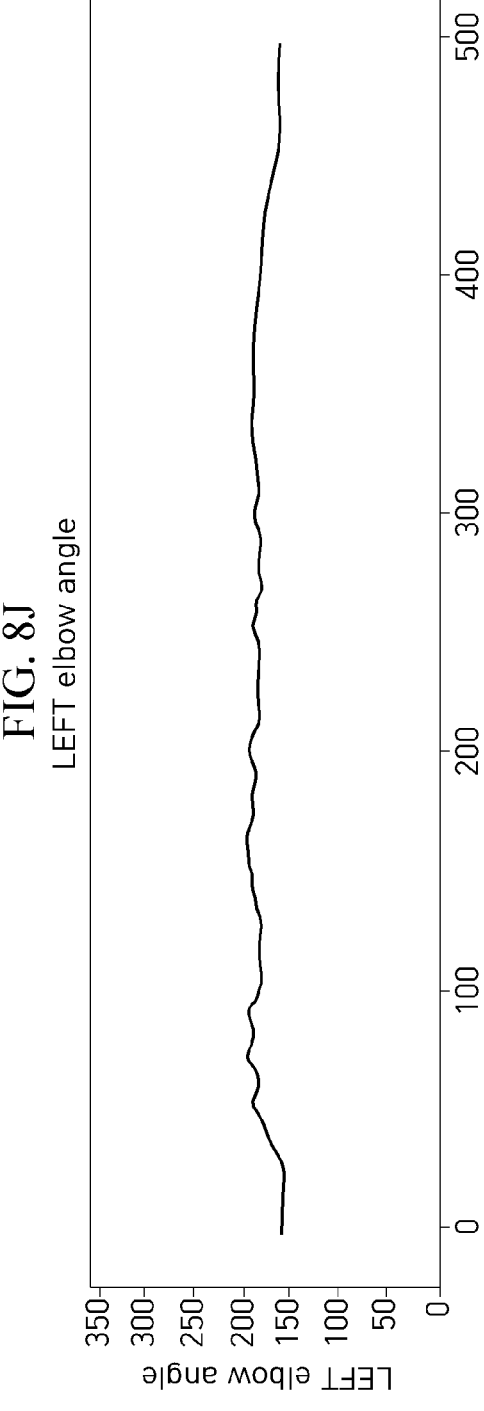

| SYMBOLS | NAMES OF MOTION FEATURES |
|---|---|
| (a) | Bounding Box horizontal length |
| (b) | Bounding Box vertical length |
| (c) | RIGHT ear-elbow distance |
| (d) | LEFT ear-elbow distance |
| (e) | RIGHT wrist-hip distance |
| (f) | LEFT wrist-hip distance |
| (g) | RIGHT armpit angle |
| (h) | LEFT armpit angle |
| (i) | RIGHT elbow angle |
| (j) | LEFT elbow angle | example, FIGS. 7A and 8A represent a change in the motion feature (a) with respect to the first motion in the form of a graph. FIGS. 7J and 8J represent a change in the motion feature (j) with respect to the first motion in the form of a graph.

In the case of a plurality of motion feature change graphs for the same motion (e.g., motion feature change graphs for the same motion which has been performed by the same person at different times, motion feature change graphs for the same motion which has been performed by a plurality of users), although forms of the graphs are similar to each other, the graphs may have a difference between motion execution times. For example, in the first motion, an execution time for a motion of straightening both arms may be different for each user. Accordingly, it is meaningless to compare motion feature change graphs for the same motion for each certain time interval on the basis of a time axis.

For this reason, the method and apparatus for classifying and evaluating a motion according to embodiments of the present disclosure use a dynamic time warping (DTW) algorithm for a comparison between motion feature change graphs. The DTW algorithm is an algorithm for measuring similarity between two similar time-series data, and can measure similarity between two similar time-series data although two time series have a time difference or have different lengths. Accordingly, the method and apparatus for classifying and evaluating a motion according to embodiments of the present disclosure can accurately measure similarity between two motion feature graphs although the two motion feature graphs have some time difference, when comparing the two motion feature graphs.

As described above, the method and apparatus for classifying and evaluating a motion according to embodiments of the present disclosure measure similarity (difference) between two motion feature graphs by using the DTW algorithm. If the two motion feature graphs are related to the same motion, a low DTW value is calculated. If the two motion feature graphs are related to different motions, a high DTW value is calculated. The method and apparatus for classifying and evaluating a motion according to embodiments of the present disclosure classify and evaluate a motion based on a DTW value.

In an embodiment of the present disclosure, ten motion features are defined with respect to each motion. The method and apparatus for classifying and evaluating a motion according to embodiments of the present disclosure calculate ten DTW values for the ten motion features by comparing ten motion feature change graphs with respect to a motion of a user and a model motion by using the DTW algorithm, and classify and evaluate the motion of the user based on the ten DTW values.

If two motions (e.g., a motion of a user and a specific model motion), that is, comparison targets, are the same motion, all DTW values for the ten motion features will be low. Accordingly, the method and apparatus for classifying and evaluating a motion according to embodiments of the present disclosure may determine, as the same motion as a motion of a user, a model motion in which an average of DTW values for the ten motion features is a minimum with respect to the motion of the user, and may determine, as a motion different from the motion of the user, a model motion in which the average of the DTW values indicates a higher value.

If a motion of a user is recognized on the basis of only a minimum value of an average of DTW values of motion features, however, there is a problem in that a model motion in which an average of DTW values for motion features is a minimum even with respect to various motions of the user which are quite different from a predefined model motion is determined as the same motion. Accordingly, it is difficult to recognize a case in which the user performs a motion different from the predefined model motion. Furthermore, a threshold of an average of DTW values of respective motion features is set. Although it is determined that the same model motion is not present with respect to an average of DTW values which is greater than a threshold, if a motion of a user is generally similar to a specific model motion and has a different movement with respect to some portion of the body of the user (e.g., a case in which the motion of the user is similar to the first motion, but only one arm is bent), an average of DTW values for all the ten motion features may be smaller than a threshold. Accordingly, there is a problem in that the motion of the user may be determine as the same motion as the specific model motion.

As a result, it is necessary to consider a maximum value of DTW values in motion classification. Accordingly, the method and apparatus for classifying and evaluating a motion according to embodiments of the present disclosure may classify and evaluate a motion of a user based on an average and a maximum value of DTW values of respective motion features. For example, the method and apparatus for classifying and evaluating a motion according to embodiments of the present disclosure may classify a motion of a user as a motion that corresponds to a model motion only when a maximum value of DTW values of respective motion features is a predetermined threshold or less, with respect to the model motion in which an average of the DTW values is a minimum with respect to the motion of the user.

Furthermore, the method and apparatus for classifying and evaluating a motion according to embodiments of the present disclosure may evaluate a motion of a user based on an average of DTW values for motion features. For example, the method and apparatus for classifying and evaluating a motion according to embodiments of the present disclosure score a motion of a user by mapping an average of DTW values for motion features to a section between a score 0 to a score 100, and evaluate the motion of the user.

Furthermore, the method and apparatus for classifying and evaluating a motion according to embodiments of the present disclosure may visualize similarity between a motion of a user and a specific model motion in a way to represent DTW values for each motion feature of the motion of the user in a radial chart (refer to FIGS. 9 and 10) by scoring the DTW values with respect to a specific model motion. The present disclosure supports that a user can easily check how much difference is present in what motion feature by comparing a motion of a user and a model motion, by visualizing similarity between motions for each motion feature.

Figure 9:
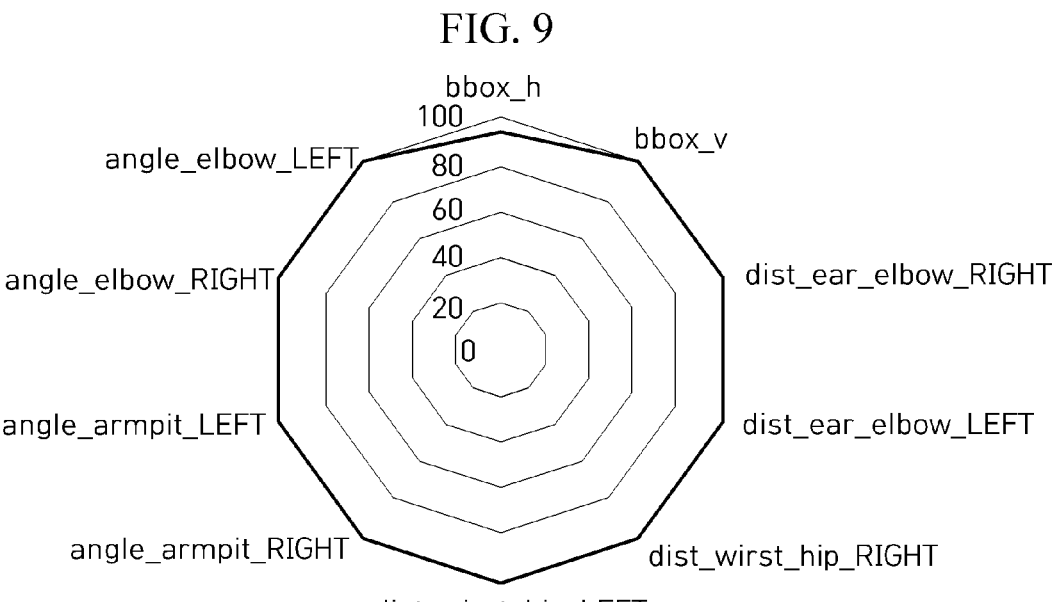
FIGS. 9 and 10 are radial charts obtained by visualizing DTW values of motion features.
Figure 10:
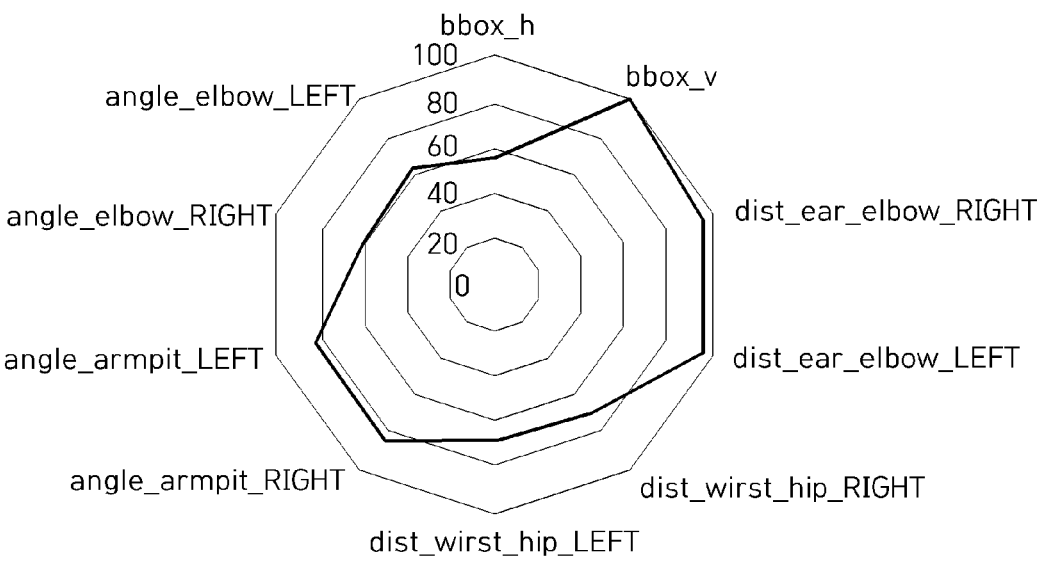

FIGS. 9 and 10 are diagrams illustrating examples in which DTW values of respective motion features are scored and then visualized in the form of a radial chart for a comparison between motions. FIG. 9 is an example of a case in which two motions, that is, comparison targets, are the same. FIG. 10 is an example of a case in which two motions, that is, comparison targets, are different from each other. The method and apparatus for classifying and evaluating a motion according to embodiments of the present disclosure may represent similarity between a motion of a user and a model motion in the form of a radial chart as in FIGS. 9 and 10 based on DTW values of respective motion features.

If the DTW values are visualized in the form of a radial chart, all scores appear high in ten directions if the two motions are the same motion as in FIG. 9. If the two motions are different motions as in FIG. 10, scores may be different depending on motion features. Referring to FIG. 10, it may be seen that relatively low scores appear in the bounding box-horizontal length (bbox h), the wrist-hip distance (dist_wrist_hip_LEFT, dist_wrist_hip_RIGHT), and the elbow angle (angle_elbow_LEFT, angle_elbow_RIGHT) compared to other motion features.

According to the aforementioned principle, motion features (e.g., a knee angle and a hip-ankle distance in the case of a lower body motion, and an elbow-knee distance and a wrist-ankle distance in the case of a motion of bending the waist) in addition to the motion features proposed in this specification may be additionally defined. The method and apparatus for classifying and evaluating a motion according to embodiments of the present disclosure may classify and evaluate various motions different from the motions exemplified in this specification, based on similarity between the motion features that have been additionally defined. In an embodiment of the present disclosure, motion features that are changed by a movement of an upper body (e.g., arms) have been basically defined and used in motion classification, but motion features that are changed by a movement of a lower body may be defined and used in motion classification through a method according to an embodiment of the present disclosure.

A method of classifying and evaluating a motion, which is proposed in the present disclosure, is a method which is more suitable for being applied to a service in which concise motions, such as indoor rehabilitation exercises, are repeatedly performed, and may be partially limited to an application in which a user freely performs a certain motion.

If simple and clear motions are previously defined with respect to a service that requires motion recognition, a method of classifying and evaluating a motion by comparing only features of motions as in an embodiment of the present disclosure, rather than recognizing and evaluating a motion by tracking coordinates or a path of each joint and comparing the motion and a model motion, may be said to be a more effective method.

FIG. 11 is a flowchart for describing a method of classifying and evaluating a motion based on a motion feature according to an embodiment of the present disclosure.

According to an embodiment of the present disclosure, the method of classifying and evaluating a motion based on a motion feature includes step S210 to step S240.

Step S210 is an image acquisition step. An apparatus 100 for classifying and evaluating a motion according to an embodiment of the present disclosure obtains video data by capturing a motion of a user by using a camera. The camera that is used by the apparatus 100 for classifying and evaluating a motion may be a color camera, but may include a color camera and a depth camera (e.g., Kinect).

Step S220 is a skeleton information extraction step. The apparatus 100 for classifying and evaluating a motion extracts skeleton information of the user from the video data obtained by capturing the motion of the user. That is, the apparatus 100 for classifying and evaluating a motion obtains the skeleton information of the user based on the video data obtained by capturing the motion of the user. The skeleton information means information on the skeleton of the user. That is, the skeleton information includes information on a location of each joint (key point) of the user, and is changed as the user moves. The apparatus 100 for classifying and evaluating a motion may extract the skeleton information of the user from the video data by using artificial intelligence (e.g., OpenPose).

As another example, the apparatus 100 for classifying and evaluating a motion may receive the skeleton information of the user from a depth camera (e.g., Kinect).

Step S230 is a motion feature extraction step. The apparatus 100 for classifying and evaluating a motion extracts a motion feature of the user from the skeleton information of the user. That is, the apparatus 100 for classifying and evaluating a motion generates motion feature data of the motion of the user based on the skeleton information of the user. Specifically, the apparatus 100 for classifying and evaluating a motion generates the motion feature data of the motion of the user based on the information on the locations of the joints of the user. The motion feature data is time-series data which may change over time, and may include a distance between two joints or the length of an edge of a two-dimensional (2-D) or three-dimensional box (3-D) (a bounding box) that surrounds the user (i.e., a motion subject). Examples of the motion feature are illustrated in Table 1.

Step S240 is a motion classification step. The apparatus 100 for classifying and evaluating a motion classifies the motion of the user based on the motion feature data of the motion of the user and motion feature data of a model motion. That is, the apparatus 100 for classifying and evaluating a motion determines similarity with respect to each of a plurality of model motions of the motion of the user, based on the motion feature data of the motion of the user and the motion feature data of the plurality of model motions, and selects a model motion most similar to the motion of the user, among the plurality of model motions, based on the determined similarity.

The apparatus 100 for classifying and evaluating a motion may use motion feature data of a model motion that has been previously received, and may generate the motion feature data of the model motion based on video data of the model motion. If the apparatus 100 for classifying and evaluating a motion generates and uses the motion feature data of the model motion, as in the process that has been described in step S210 to step S230, first, the apparatus 100 for classifying and evaluating a motion first receives motion feature data of a model motion, generates skeleton information of the model motion based on video data of the model motion, and generates motion feature data of the model motion based on the skeleton information of the model motion.

Specifically, the apparatus 100 for classifying and evaluating a motion calculates similarity for each motion feature of the motion of the user with respect to each of the plurality of model motions, based on the motion feature data of the motion of the user and the motion feature data of the plurality of model motions, and selects a model motion most similar to the motion of the user, among the plurality of model motions, based on the similarity for each motion feature. The apparatus 100 for classifying and evaluating a motion may use the DTW algorithm in order to measure similarity between two motion feature data. In this case, when a DTW value calculated based on the two motion feature data becomes small, the two motion feature data may be said to be similar to each other.

For example, the apparatus 100 for classifying and evaluating a motion calculates a DTW value for each motion feature with respect to the motion feature data of the motion of the user and one of the plurality of model motions. The apparatus 100 for classifying and evaluating a motion may calculate an average of DTW values for each motion feature between the motion of the user and each of the plurality of model motions, and may primarily select a model motion having a minimum value, among the averages of the DTW values, as a model motion most similar to the motion of the user. Furthermore, when a maximum value of the DTW values for each motion feature between the model motion that has been primarily selected as the most similar model motion and the motion of the user is a predetermined threshold or less, the apparatus 100 for classifying and evaluating a motion may finally determine the model motion as a model motion most similar to the motion of the user. When the maximum value is greater than the threshold, the apparatus 100 for classifying and evaluating a motion may finally determine that a model motion most similar to the motion of the user is not present.

The apparatus 100 for classifying and evaluating a motion may visualize and represent similarity between the motion of the user and a model motion that has been designated by the user by scoring the DTW values for each motion feature based on the motion feature data of the motion of the user and the motion feature data of the model motion designated by the user and representing the scores in a radial chart (refer to FIGS. 9 and 10).

The aforementioned method of classifying and evaluating a motion has been described with reference to the flowcharts presented in the drawings. For a simple description, the method has been illustrated and described as a series of blocks, but the present disclosure is not limited to the sequence of the blocks, and some blocks may be performed in a sequence different from that of or simultaneously with that of other blocks, which have been illustrated and described in this specification. Various other branches, flow paths, and sequences of blocks which achieve the same or similar results may be implemented. Furthermore, all the blocks illustrated in order to implement the method described in this specification may not be required.

In the description given with reference to FIG. 11, each step may be further divided into additional steps or may be combined into smaller steps depending on an implementation example of the present disclosure. Furthermore, some steps may be omitted, if necessary, and the sequence of steps may be changed. Furthermore, although contents are omitted, the contents described with reference to FIGS. 1 to 10 may be applied to the contents described with reference to FIG. 11. Furthermore, the contents described with reference to FIG. 11 may be applied to the contents described with reference to FIGS. 1 to 10.

FIG. 12 is a block diagram illustrating a construction of the apparatus for classifying and evaluating a motion based on a motion feature.

The apparatus 100 for classifying and evaluating a motion according to an embodiment of the present disclosure includes an image input unit 110, a skeleton information extraction unit 120, a motion feature extraction unit 130, and a motion classification unit 140.

The image input unit 110 obtains video data by capturing a motion of a user by using a camera embedded therein. The camera may be a color camera, but may include a color camera and a depth camera (e.g., Kinect).

The skeleton information extraction unit 120 extracts skeleton information of the user from the video data obtained by capturing the motion of the user. That is, the skeleton information extraction unit 120 obtains the skeleton information of the user based on the video data obtained by capturing the motion of the user. The skeleton information extraction unit 120 may extract the skeleton information of the user from the video data by using artificial intelligence (e.g., OpenPose).

As another example, the skeleton information extraction unit 120 may receive the skeleton information of the user from a depth camera (e.g., Kinect) that is included in the image input unit 110.

The motion feature extraction unit 130 extracts a motion feature of the user from the skeleton information of the user. That is, the motion feature extraction unit 130 generates motion feature data of the motion of the user based on the skeleton information of the user. Specifically, the motion feature extraction unit 130 generates the motion feature data of the motion of the user based on information on locations of joints of the user. The motion feature data is time-series data which may change over time, and may include a distance between two joints or the length of an edge of a two-dimensional (2-D) or three-dimensional box (3-D) (a bounding box) that surrounds the user (i.e., a motion subject). Examples of the motion feature are illustrated in Table 1.

The motion classification unit 140 classifies the motion of the user based on the motion feature data of the motion of the user and the motion feature data of a model motion. That is, the motion classification unit 140 determines similarity with respect to each of a plurality of model motions of the motion of the user, based on the motion feature data of the motion of the user and the motion feature data of the plurality of model motions, and selects a model motion most similar to the motion of the user, among the plurality of model motions, based on the determined similarity.

The motion classification unit 140 may use motion feature data of a model motion that has been previously received, and may use the motion feature data generated based on video data of the model motion. If the motion classification unit 140 uses the motion feature data of the model motion that has been generated based on the video data, first, after the image input unit 110 receives the video data of the model motion, the skeleton information extraction unit 120 generates skeleton information of the model motion based on the video data of the model motion. The motion feature extraction unit 130 generates motion feature data of the model motion based on skeleton information of the model motion, and transfers the motion feature data of the model motion to the motion classification unit 140.

Specifically, the motion classification unit 140 calculates similarity for each motion feature of the motion of the user with respect to each of the plurality of model motions, based on the motion feature data of the motion of the user and the motion feature data of the plurality of model motions, and selects a model motion most similar to the motion of the user, among the plurality of model motions, based on the similarity for each motion feature. The motion classification unit 140 may use the DTW algorithm in order to measure similarity between two motion feature data. In this case, when a DTW value calculated based on the two motion feature data becomes small, the two motion feature data may be said to be similar to each other.

For example, the motion classification unit 140 calculates a DTW value for each motion feature with respect to the motion feature data of the motion of the user and one of the plurality of model motions. The motion classification unit 140 may calculate an average of DTW values for each motion feature between the motion of the user and each of the plurality of model motions, and may primarily select a model motion having a minimum value, among the averages of the DTW values, as a model motion most similar to the motion of the user. Furthermore, when a maximum value of the DTW values for each motion feature between the model motion that has been primarily selected as the most similar model motion and the motion of the user is a predetermined threshold or less, the motion classification unit 140 may finally determine the model motion as a model motion most similar to the motion of the user. When the maximum value is greater than the threshold, the motion classification unit 140 may finally determine that a model motion most similar to the motion of the user is not present.

The motion classification unit 140 may visualize and represent similarity between the motion of the user and a model motion that has been designated by the user by scoring the DTW values for each motion feature based on the motion feature data of the motion of the user and the motion feature data of the model motion designated by the user and representing the scores in a radial chart (refer to FIGS. 9 and 10).

The contents described with reference to FIGS. 1 to 11 may be applied to the contents described with reference to FIG. 12.

Figure 13:
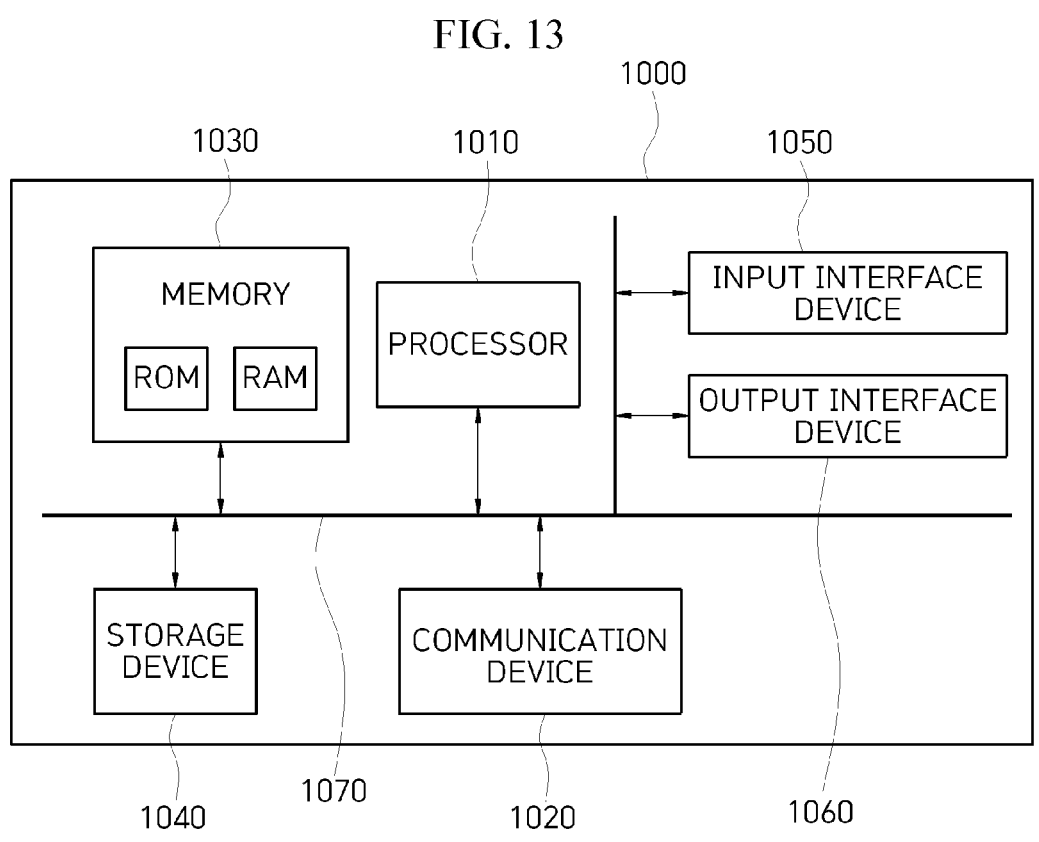
FIG. 13 is a block diagram illustrating a computer system for implementing the method of classifying and evaluating a motion according to an embodiment of the present disclosure.

FIG. 13 is a block diagram illustrating a computer system for implementing the method of classifying and evaluating a motion according to an embodiment of the present disclosure.

Referring to FIG. 13, a computer system 1000 may include at least one of a processor 1010, memory 1030, an input interface device 1050, an output interface device 1060, and a storage device 1040 which communicate with one another through a bus 1070. The computer system 1000 may further include a communication device 1020 connected to a network. The processor 1010 may be a central processing unit (CPU) or may be a semiconductor device that executes an instruction stored in the memory 1030 or the storage device 1040. The memory 1030 and the storage device 1040 may include various types of volatile or nonvolatile storage media. For example, the memory may include read only memory (ROM) and random access memory (RAM). In an embodiment of this writing, the memory may be disposed inside or outside the processor, and the memory may be connected to the processor through various means that has already been known. The memory includes various types of volatile or nonvolatile storage media. For example, the memory may include ROM or RAM.

Accordingly, an embodiment of the present disclosure may be implemented as a method implemented in a computer or may be implemented as a non-transitory computer-readable medium in which a computer-executable instruction has been stored. In an embodiment, when being executed by a processor, a computer-readable instruction may perform a method according to at least one aspect of this writing.

The communication device 1020 may transmit or receive a wired signal or a wireless signal.

Furthermore, a method according to an embodiment of the present disclosure may be implemented in the form of a program instruction which may be executed through various computer means, and may be recorded on a computer-readable medium.

The computer-readable recording medium may include a program instruction, a data file, and a data structure alone or in combination. A program instruction recorded on the computer-readable recording medium may be specially designed and constructed for an embodiment of the present disclosure or may be known and available to those skilled in the computer software field. The computer-readable recording medium may include a hardware device configured to store and execute the program instruction. For example, the computer-readable recording medium may include magnetic media such as a hard disk, a floppy disk, and a magnetic tape, optical media such as CD-ROM and a DVD, magneto-optical media such as a floptical disk, ROM, RAM, and flash memory. The program instruction may include not only a machine code produced by a compiler, but a high-level language code capable of being executed by a computer through an interpreter.

For reference, the components according to an embodiment of the present disclosure may be implemented in the form of software or hardware, such as a field programmable gate array (FPGA) or an application specific integrated circuit (ASIC), and may perform predetermined roles.

However, the "components" are not meanings limited to software or hardware, and each component may be configured to reside on an addressable storage medium and may be configured to operate on one or more processors.

Accordingly, for example, the component may include components, such as software components, object-oriented software components, class components, and task components, processes, functions, attributes, procedures, sub-routines, segments of a program code, drivers, firmware, a microcode, circuitry, data, a database, data structures, tables, arrays, and variables.

Components and functions provided in corresponding components may be combined into fewer components or may be further separated into additional components.

In the present disclosure, it will be understood that each block of the flowcharts and combinations of the blocks in the flowcharts may be executed by computer program instructions. These computer program instructions may be mounted on the processor of a general purpose computer, a special purpose computer, or other programmable data processing equipment, so that the instructions executed by the processor of the computer or other programmable data processing equipment create means for executing the functions specified in the flowchart block(s). These computer program instructions may also be stored in a computer-usable or computer-readable memory that can direct a computer or other programmable data processing equipment to implement a function in a particular manner. Accordingly, instructions that use a corresponding computer or that are stored in computer-readable memory may also produce a manufacturing item involving instruction means that performs a function described in a block(s) of a flowchart. The computer program instructions may also be loaded on a computer or other programmable data processing equipment to cause a series of operational steps to be performed on the computer or other programmable data processing equipment to produce a computer-executed process, so that the instructions executing the computer or other programmable data processing equipment provide steps for executing the functions described in the flowchart block(s).

Furthermore, each block of the flowcharts may represent a portion of a module, a segment, or code, which includes one or more executable instructions for executing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term " . . . unit" used in the present embodiment means software or a hardware component, such as an FPGA or an ASIC, and the " . . . unit" performs specific tasks. However, the term " . . . unit" does not mean that it is limited to software or hardware. The " . . . unit" may be configured to reside on an addressable storage medium and configured to operate one or more processors. Accordingly, examples of the " . . . unit" may include components, such as software components, object-oriented software components, class components, and task components, processes, functions, attributes, procedures, sub-routines, segments of a program code, drivers, firmware, a microcode, circuitry, data, a database, data structures, tables, arrays, and variables. The functionalities provided in the components and the " . . . units" may be combined into fewer components and " . . . units", or may be further separated into additional components and " . . . units". Furthermore, the components and the " . . . units" may be implemented to operate one or more CPUs within a device or a security multimedia card.

The constructions of the present disclosure have been described in detail above with reference to the accompanying drawings, but are merely illustrative. A person having ordinary knowledge in the art to which the present disclosure pertains will understand that various modifications and changes are possible without departing from the technical spirit of the present disclosure. Accordingly, the scope of the present disclosure should not be limited to the aforementioned embodiments, and should be defined by the writing of the appended claims.

DESCRIPTION OF REFERENCE NUMERALS

100: apparatus for classifying and evaluating motion
110: image input unit
120: skeleton information extraction unit
130: motion feature extraction unit
140: motion classification unit
1000: computer system
1010: processor
1020: communication device
1030: memory
1040: storage device
1050: input interface device
1060: output interface device
1070: bus

What is claimed is:

1. A method of classifying and evaluating a motion based on a motion feature, the method comprising:
    obtaining video data by capturing a first motion;
    obtaining information on locations of joints of the first motion based on the video data;
    generating motion feature data of the first motion based on the information on the locations of the joints; and
    selecting a model motion most similar to the first motion, among a plurality of model motions, based on the motion feature data of the first motion and motion feature data of the plurality of model motions;
    wherein the motion feature data of the first motion and the plurality of model motions comprises at least any one of a distance between the locations of the joints and a length of an edge of a bounding box that surrounds a motion subject or a combination of the distance between the locations of the joints and the length of the edge of the bounding box.

2. The method of claim 1, wherein the selecting of the model motion most similar to the first motion comprises:
    calculating similarity for each motion feature with respect to each of the plurality of model motions based on the motion feature data of the first motion and the motion feature data of the plurality of model motions, and
    selecting the model motion most similar to the first motion from the plurality of model motions based on the similarity for each motion feature.

3. The method of claim 1, wherein the selecting of the model motion most similar to the first motion comprises:
    calculating a dynamic time warping (DTW) value of each of the plurality of model motions for each motion feature based on the motion feature data of the first motion and the motion feature data of the plurality of model motions, and
    selecting the model motion most similar to the first motion from the plurality of model motions based on the DTW value for each motion feature.

4. The method of claim 3, wherein the selecting of the model motion most similar to the first motion comprises:
    after calculating the DTW value for each motion feature, calculating an average of the DTW values of each of the plurality of model motions for each motion feature on the basis of the first motion, and
    selecting a model motion having a minimum value, among the averaged DTW values, as the model motion most similar to the first motion.

5. The method of claim 3, wherein the selecting of the model motion most similar to the first motion comprises:
    after calculating the DTW value for each motion feature, calculating an average of the DTW values of each of the plurality of model motions for each motion feature on the basis of the first motion, and
    selecting, as the model motion most similar to the first motion, a model motion which has a minimum value, among the averaged DTW values, and in which a maximum value of the DTW values for each motion feature is a predetermined threshold or less.

6. A method of classifying and evaluating a motion based on a motion feature, the method comprising:
    obtaining video data by capturing a first motion;
    obtaining information on locations of joints of the first motion based on the video data;
    generating motion feature data of the first motion based on the information on the locations of the joints;
    calculating a dynamic time warping (DTW) value for each motion feature between the first motion and a specific model motion based on the motion feature data of the first motion and motion feature data of the specific model motion, calculating a score for each motion feature based on the DTW value for each motion feature, and visualizing and representing the scores in a radial chart form;
    after calculating the DTW value for each motion feature, calculating an average of DTW values; and
    based on the DTW values, selecting a model motion having a minimum value, among the averaged DTW values, as a model motion most similar to the first motion.

7. An apparatus for classifying and evaluating a motion based on a motion feature, the apparatus comprising:
    an image input unit configured to obtain video data by capturing a first motion;
    a skeleton information extraction unit configured to obtain information on locations of joints of the first motion based on the video data;
    a motion feature extraction unit configured to generate motion feature data of the first motion based on the information on the locations of the joints; and
    a motion classification unit configured to select a model motion most similar to the first motion, among a plurality of model motions, based on the motion feature data of the first motion and motion feature data of the plurality of model motions;

wherein the motion feature data of the first motion and the plurality of model motions comprises at least any one of a distance between the locations of the joints and a length of an edge of a bounding box that surrounds a motion subject or a combination of the distance between the locations of the joints and the length of the edge of the bounding box.

8. The apparatus of claim 7, wherein the motion classification unit calculates similarity for each motion feature with respect to each of the plurality of model motions based on the motion feature data of the first motion and the motion feature data of the plurality of model motions, and selects the model motion most similar to the first motion from the plurality of model motions based on the similarity for each motion feature.

9. The apparatus of claim 7, wherein the motion classification unit calculates a dynamic time warping (DTW) value of each of the plurality of model motions for each motion feature based on the motion feature data of the first motion and the motion feature data of the plurality of model motions, and selects the model motion most similar to the first motion from the plurality of model motions based on the DTW value for each motion feature.

10. The apparatus of claim 9, wherein after calculating the DTW value for each motion feature, the motion classification unit calculates an average of the DTW values of each of the plurality of model motions for each motion feature on the basis of the first motion, and selects a model motion having a minimum value, among the averaged DTW values, as the model motion most similar to the first motion.

11. The apparatus of claim 9, wherein after calculating the DTW value for each motion feature, the motion classification unit calculates an average of the DTW values of each of the plurality of model motions for each motion feature on the basis of the first motion, and selects, as the model motion most similar to the first motion, a model motion which has a minimum value, among the averaged DTW values, and in which a maximum value of the DTW values for each motion feature is a predetermined threshold or less.

12. The apparatus of claim 9, wherein the motion classification unit visualizes and represents, in a radial chart form, similarity for each motion feature of each of the plurality of model motions based on the DTW values for each motion feature.

* * * * *